US010332229B2

(12) United States Patent
Zhou

(10) Patent No.: US 10,332,229 B2
(45) Date of Patent: Jun. 25, 2019

(54) SYSTEM AND METHOD FOR HIGH PERFORMANCE K-MEANS CLUSTERING ON GPU WITH SMART KERNELS

(71) Applicant: Palo Alto Research Center Incorporated, Palo Alto, CA (US)

(72) Inventor: Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 871 days.

(21) Appl. No.: 14/275,347

(22) Filed: May 12, 2014

(65) Prior Publication Data

US 2015/0324441 A1    Nov. 12, 2015

(51) Int. Cl.
  *G06F 16/00*       (2019.01)
  *G06T 1/20*        (2006.01)
  *G06F 16/245*      (2019.01)
  *G06F 16/28*       (2019.01)

(52) U.S. Cl.
  CPC ............... *G06T 1/20* (2013.01); *G06F 16/00* (2019.01); *G06F 16/245* (2019.01); *G06F 16/285* (2019.01); *G06T 2200/28* (2013.01)

(58) Field of Classification Search
  CPC ......... G06F 17/30598; G06F 17/30424; G06F 17/30; G06T 1/20; G06T 2200/28
  USPC ....................................................... 707/737
  See application file for complete search history.

(56) References Cited

U.S. PATENT DOCUMENTS

| 8,203,564 | B2 | 6/2012 | Jiao |
| 8,443,348 | B2 | 5/2013 | McGuire |
| 8,643,656 | B2 | 2/2014 | Li |
| 8,738,349 | B2 | 5/2014 | Bertacco |
| 8,887,056 | B2 | 11/2014 | Breternitz |
| 9,019,286 | B2 | 4/2015 | Becker |
| 9,142,005 | B2 | 9/2015 | Lukyanov |
| 9,384,024 | B2 | 7/2016 | Ramakrishnan |
| 2007/0294663 | A1 | 12/2007 | McGuire |
| 2008/0198168 | A1 | 8/2008 | Jiao |
| 2011/0022817 | A1 | 1/2011 | Gaster |
| 2011/0257955 | A1 | 10/2011 | Bertacco |
| 2012/0081373 | A1* | 4/2012 | Li ........................ G06F 9/4893 345/520 |
| 2013/0091507 | A1 | 4/2013 | Wu |
| 2013/0328895 | A1 | 12/2013 | Sellers |

(Continued)

OTHER PUBLICATIONS

Zechner, Mario and Granitzer, Michael, "Accelerating K-Means on the Graphics Processor via Cuda"; Apr. 20-25, 2009, Intensive Applications and Services 2009, First International Conference Apr. 20-25, 2009, Publisher IEEE.*

(Continued)

*Primary Examiner* — Hosain T Alam
*Assistant Examiner* — Tracy M McGhee
(74) *Attorney, Agent, or Firm* — Fay Sharpe LLP

(57) ABSTRACT

Provided is a high-performance implementation of the k-means clustering algorithm on a graphics processing unit (GPU), which leverages a set of GPU kernels with complimentary strengths for datasets of various dimensions and for different numbers of clusters. The concepts of non-dominated GPU kernels and efficient strategies to select high-throughput kernels that match the arguments of the clustering problem with the underlying GPU hardware for maximum speedup are provided.

14 Claims, 14 Drawing Sheets

(56) References Cited

U.S. PATENT DOCUMENTS

| | | |
|---|---|---|
| 2014/0300538 A1 | 10/2014 | Rijnders |
| 2014/0330633 A1 | 11/2014 | Moran |
| 2015/0088954 A1 | 3/2015 | Bakos |
| 2015/0205005 A1 | 7/2015 | Klie |
| 2015/0220335 A1 | 8/2015 | Mitra |

OTHER PUBLICATIONS

You, Li., Speeding up k-means algorithm by GPUs., Journal of Computer and System Sciences vol. 79 (2013) 216-229., Available online May 8, 2012.*

Nath et al., "An Improved MAGMA GEMM for Fermi GPUs", International Journal of High Performance Computing Applications, Jul. 20, 2010, 8 pages.

Wu et al., "GPU-Accelerated Large Scale Analytics", Hewlett-Packard Development Company, L.P. Mar. 6, 2009, 11 pages.

Nath et al., SC, Nov. 12-18, 2011, Seatle, Washington, ACM 978-1-4503-0771, 10 pages.

U.S. Appl. No. 14/275,382, filed May 12, 2014, entitled "System and Method for Selecting Useful Smart Kernels for General-Purpose GPU Computing", by Rong Zhou.

\* cited by examiner

| | k=100 | | | | | | k=400 | | | | | |
|---|---|---|---|---|---|---|---|---|---|---|---|---|
| d | AGT | AS | AST | ASU | ASUT | max/min | AGT | AS | AST | ASU | ASUT | max/min |
| 2 | 19 | 20 | 20 | 12 | 13 | 159% | 74 | 77 | 77 | 42 | 43 | 182% |
| 3 | 24 | 21 | 21 | 19 | 19 | 128% | 95 | 80 | 81 | 66 | 66 | 144% |
| 4 | 28 | 25 | 23 | 20 | 19 | 148% | 111 | 98 | 90 | 68 | 66 | 167% |
| 5 | 32 | 29 | 29 | 28 | 28 | 116% | 126 | 113 | 113 | 97 | 97 | 130% |
| 6 | 36 | 32 | 31 | 29 | 28 | 127% | 141 | 123 | 122 | 99 | 99 | 143% |
| 7 | 40 | 35 | 35 | 37 | 36 | 116% | 157 | 132 | 137 | 128 | 127 | 123% |
| 8 | 44 | 37 | 36 | 35 | 33 | 132% | 172 | 142 | 141 | 118 | 117 | 147% |
| 9 | 48 | 42 | 42 | 38 | 37 | 130% | 187 | 159 | 162 | 130 | 128 | 146% |
| 10 | 52 | 46 | 43 | 45 | 43 | 121% | 203 | 169 | 168 | 154 | 152 | 134% |
| 11 | 56 | 53 | 48 | 45 | 44 | 128% | 218 | 197 | 195 | 160 | 157 | 139% |
| 12 | 59 | 52 | 48 | 50 | 47 | 125% | 234 | 196 | 193 | 177 | 175 | 133% |
| 13 | 63 | 57 | 54 | 51 | 51 | 125% | 249 | 223 | 223 | 188 | 184 | 135% |
| 14 | 67 | 59 | 55 | 63 | 59 | 123% | 264 | 223 | 220 | 227 | 215 | 123% |
| 15 | 71 | 66 | 61 | 62 | 57 | 124% | 280 | 256 | 252 | 215 | 211 | 133% |
| 16 | 75 | 65 | 59 | 67 | 61 | 127% | 296 | 368 | 360 | 360 | 361 | 124% |
| 17 | 79 | 74 | 67 | 71 | 65 | 122% | 311 | 432 | 430 | 377 | 373 | 139% |
| 18 | 84 | 74 | 67 | 76 | 68 | 125% | 327 | 399 | 396 | 398 | 393 | 122% |
| 19 | 88 | 84 | 75 | 80 | 72 | 122% | 342 | 482 | 478 | 419 | 412 | 141% |
| 20 | 91 | 82 | 73 | 85 | 76 | 126% | 357 | 446 | 439 | 451 | 454 | 127% |
| 21 | 95 | 92 | 82 | 95 | 79 | 121% | 373 | 522 | 521 | 467 | 462 | 140% |
| 22 | 99 | 93 | 80 | 100 | 89 | 126% | 388 | 476 | 469 | 490 | 478 | 126% |
| 23 | 103 | 104 | 89 | 106 | 93 | 120% | 404 | 573 | 569 | 511 | 502 | 142% |
| 24 | 107 | 104 | 88 | 113 | 97 | 128% | 419 | 526 | 516 | 543 | 536 | 130% |
| 25 | 112 | 117 | 95 | 118 | 102 | 124% | 435 | 617 | 610 | 560 | 555 | 142% |
| 26 | 116 | 115 | 98 | 124 | 105 | 126% | 450 | 578 | 569 | 582 | 568 | 129% |
| 27 | 120 | 129 | 103 | 130 | 110 | 126% | 464 | 667 | 661 | 605 | 592 | 144% |
| 28 | 124 | 125 | 103 | 137 | 115 | 133% | 481 | 607 | 592 | 636 | 633 | 132% |
| 29 | 128 | 140 | 118 | 143 | 129 | 121% | 496 | 709 | 701 | 657 | 647 | 143% |
| 30 | 132 | 137 | 110 | 149 | 121 | 135% | 513 | 640 | 623 | 680 | 657 | 133% |
| 31 | 136 | 154 | 126 | 156 | 126 | 124% | 526 | MEM | MEM | MEM | MEM | N/A |
| 32 | 139 | 150 | 117 | 164 | 131 | 140% | 544 | MEM | MEM | MEM | MEM | N/A |
| 33 | 170 | 165 | 135 | 170 | 135 | 126% | 599 | MEM | MEM | MEM | MEM | N/A |
| 34 | 166 | 162 | 127 | 174 | 139 | 137% | 603 | MEM | MEM | MEM | MEM | N/A |
| 35 | 179 | 176 | 143 | 180 | 143 | 126% | 636 | MEM | MEM | MEM | MEM | N/A |
| 36 | 172 | 169 | 131 | 185 | 146 | 141% | 670 | MEM | MEM | MEM | MEM | N/A |
| 37 | 187 | 185 | 150 | 191 | 152 | 128% | 730 | MEM | MEM | MEM | MEM | N/A |
| 38 | 186 | 179 | 139 | 194 | 154 | 140% | 789 | MEM | MEM | MEM | MEM | N/A |
| 39 | 200 | 195 | 159 | 200 | 160 | 126% | 813 | MEM | MEM | MEM | MEM | N/A |
| 40 | 186 | 187 | 144 | 205 | 162 | 143% | 844 | MEM | MEM | MEM | MEM | N/A |

TABLE 1: TIMING RESULTS (IN MILLISECONDS FOR VARIOUS k-MEANS ASSIGNMENT KERNELS

FIG. 6

| d | k=100 | | | | k=400 | | | |
|---|---|---|---|---|---|---|---|---|
| | UGT | US | UST | $\frac{max}{min}$ | UGT | US | UST | $\frac{max}{min}$ |
| 2 | 40 | 14 | 17 | 293% | 44 | 18 | 21 | 249% |
| 3 | 40 | 14 | 17 | 294% | 48 | 21 | 25 | 227% |
| 4 | 40 | 14 | 18 | 296% | 50 | 23 | 28 | 220% |
| 5 | 41 | 14 | 18 | 296% | 53 | 26 | 32 | 199% |
| 6 | 42 | 14 | 18 | 297% | 54 | 32 | 39 | 171% |
| 7 | 42 | 14 | 18 | 299% | 55 | 42 | 52 | 133% |
| 8 | 43 | 14 | 18 | 303% | 55 | 41 | 53 | 133% |
| 9 | 44 | 15 | 19 | 303% | 58 | 43 | 53 | 133% |
| 10 | 45 | 15 | 19 | 303% | 58 | 61 | 76 | 130% |
| 11 | 46 | 15 | 19 | 305% | 59 | 63 | 77 | 129% |
| 12 | 46 | 15 | 19 | 304% | 59 | 64 | 77 | 131% |
| 13 | 47 | 16 | 19 | 298% | 61 | 67 | 78 | 129% |
| 14 | 48 | 16 | 19 | 297% | 61 | 68 | 78 | 129% |
| 15 | 49 | 20 | 23 | 247% | 62 | 135 | 152 | 246% |
| 16 | 47 | 19 | 25 | 250% | 58 | 118 | 153 | 262% |
| 17 | 50 | 22 | 25 | 229% | 63 | 138 | 155 | 245% |
| 18 | 51 | 22 | 25 | 235% | 63 | 135 | 155 | 245% |
| 19 | 51 | 22 | 25 | 237% | 65 | 137 | 158 | 244% |
| 20 | 51 | 24 | 30 | 212% | 64 | 132 | 158 | 247% |
| 21 | 52 | 25 | 30 | 213% | 66 | 136 | 161 | 243% |
| 22 | 53 | 24 | 30 | 216% | 66 | 134 | 161 | 244% |
| 23 | 53 | 25 | 30 | 217% | 67 | 137 | 163 | 243% |
| 24 | 52 | 28 | 36 | 187% | 65 | 130 | 163 | 250% |
| 25 | 54 | 30 | 36 | 184% | 68 | 138 | 166 | 243% |
| 26 | 55 | 29 | 37 | 187% | 69 | 137 | 166 | 242% |
| 27 | 55 | 30 | 37 | 188% | 70 | 139 | 169 | 241% |
| 28 | 55 | 29 | 37 | 192% | 69 | 136 | 169 | 244% |
| 29 | 57 | 29 | 37 | 192% | 71 | 140 | 171 | 241% |
| 30 | 57 | 38 | 49 | 148% | 71 | MEM | MEM | N/A |
| 31 | 58 | 39 | 50 | 149% | 73 | MEM | MEM | N/A |
| 32 | 52 | 38 | 49 | 135% | 63 | MEM | MEM | N/A |
| 33 | 77 | 76 | 69 | 112% | 94 | MEM | MEM | N/A |
| 34 | 77 | 75 | 69 | 112% | 95 | MEM | MEM | N/A |
| 35 | 78 | 75 | 70 | 113% | 96 | MEM | MEM | N/A |
| 36 | 78 | 73 | 70 | 111% | 95 | MEM | MEM | N/A |
| 37 | 80 | 74 | 70 | 114% | 98 | MEM | MEM | N/A |
| 38 | 80 | 73 | 70 | 114% | 98 | MEM | MEM | N/A |
| 39 | 81 | 73 | 71 | 115% | 100 | MEM | MEM | N/A |
| 40 | 79 | 99 | 101 | 128% | 97 | MEM | MEM | N/A |

TABLE2: TIMING RESULTS (IN MILLISECONDS) FOR VARIOUS k-MEANS UPDATE KERNELS

FIG. 7

| $f$ | $k=100$ | $k=400$ | TOTAL |
|---|---|---|---|
| AGT | 0 | 25 | 25 |
| AS | 1 | 0 | 1 |
| AST | 23 | 0 | 23 |
| ASU | 1 | 2 | 3 |
| ASUT | 14 | 12 | 26 |
| UGT | 1 | 31 | 32 |
| US | 31 | 8 | 39 |
| UST | 7 | 0 | 7 |

TABLE2: VICTORY STATISTICS FOR
VARIOUS $k$-MEANS $\alpha$-KERNELS

FIG. 8

| | ASSIGNMENT | | | | UPDATE | | | | MINIMUM $s_{max}$: |
|---|---|---|---|---|---|---|---|---|---|
| | $k$=100 | | $k$=400 | | $k$=100 | | $k$=400 | | |
| $d$ | $h$ | $s_{max}$ | $h$ | $s_{max}$ | $h$ | $s_{max}$ | $h$ | $s_{max}$ | $\hat{s}$ |
| 2 | 0.74 | 5.1% | 0.67 | 6.5% | 0.58 | 14% | 0.64 | 12% | 5.1% |
| 3 | 0.92 | 1.7% | 0.85 | 3.0% | 0.58 | 14% | 0.67 | 11% | 1.7% |
| 4 | 0.83 | 3.4% | 0.77 | 4.7% | 0.57 | 14% | 0.68 | 11% | 3.4% |
| 5 | 0.95 | 1.0% | 0.89 | 2.2% | 0.57 | 14% | 0.71 | 9.6% | 1.0% |
| 6 | 0.90 | 1.9% | 0.84 | 3.1% | 0.57 | 14% | 0.76 | 8.0% | 1.9% |
| 7 | 0.94 | 1.2% | 0.93 | 1.3% | 0.57 | 14% | 0.84 | 5.4% | 1.2% |
| 8 | 0.90 | 2.0% | 0.85 | 3.1% | 0.56 | 15% | 0.83 | 5.6% | 2.0% |
| 9 | 0.89 | 2.2% | 0.84 | 3.3% | 0.57 | 14% | 0.84 | 5.3% | 2.2% |
| 10 | 0.94 | 1.3% | 0.90 | 2.0% | 0.57 | 14% | 0.89 | 3.6% | 1.3% |
| 11 | 0.89 | 2.3% | 0.85 | 3.1% | 0.57 | 14% | 0.89 | 3.6% | 2.3% |
| 12 | 0.92 | 1.5% | 0.90 | 2.0% | 0.57 | 14% | 0.88 | 3.9% | 1.5% |
| 13 | 0.91 | 1.9% | 0.86 | 2.7% | 0.58 | 14% | 0.88 | 3.9% | 1.9% |
| 14 | 0.90 | 1.9% | 0.93 | 1.3% | 0.58 | 14% | 0.88 | 4.0% | 1.3% |
| 15 | 0.90 | 1.9% | 0.87 | 2.6% | 0.65 | 12% | 0.53 | 16% | 1.9% |
| 16 | 0.90 | 1.9% | 0.85 | 3.1% | 0.62 | 13% | 0.53 | 16% | 1.9% |
| 17 | 0.91 | 1.8% | 0.81 | 3.8% | 0.68 | 11% | 0.53 | 16% | 1.8% |
| 18 | 0.91 | 1.8% | 0.85 | 2.9% | 0.66 | 11% | 0.54 | 15% | 1.8% |
| 19 | 0.90 | 2.0% | 0.80 | 4.0% | 0.66 | 11% | 0.54 | 15% | 2.0% |
| 20 | 0.89 | 2.2% | 0.83 | 3.4% | 0.69 | 10% | 0.54 | 15% | 2.2% |
| 21 | 0.89 | 2.2% | 0.79 | 4.1% | 0.69 | 10% | 0.55 | 15% | 2.2% |
| 22 | 0.86 | 2.7 | 0.84 | 3.1% | 0.69 | 10% | 0.55 | 15% | 2.7% |
| 23 | 0.90 | 2.1% | 0.79 | 4.2% | 0.68 | 11% | 0.55 | 15% | 2.1% |
| 24 | 0.87 | 2.7% | 0.82 | 3.5% | 0.72 | 9.4% | 0.55 | 15% | 2.7% |
| 25 | 0.88 | 2.5% | 0.78 | 4.3% | 0.74 | 8.7% | 0.55 | 15% | 2.5% |
| 26 | 0.88 | 2.4% | 0.82 | 3.6% | 0.73 | 9.1% | 0.55 | 15% | 2.4% |
| 27 | 0.87 | 2.6% | 0.78 | 4.5% | 0.73 | 9.1% | 0.56 | 15% | 2.6% |
| 28 | 0.85 | 2.9% | 0.82 | 3.7% | 0.71 | 9.6% | 0.56 | 15% | 2.9% |
| 29 | 0.91 | 1.8% | 0.77 | 4.6% | 0.72 | 9.4% | 0.56 | 15% | 1.8% |
| 30 | 0.85 | 3.0% | 0.82 | 3.5% | 0.80 | 6.8% | 1.00 | 0.0% | 0.0% |
| 31 | 0.90 | 1.9% | 1.00 | 0.0% | 0.80 | 6.8% | 1.00 | 0.0% | 0.0% |
| 32 | 0.84 | 3.3% | 1.00 | 0.0% | 0.82 | 5.9% | 1.00 | 0.0% | 0.0% |
| 33 | 0.87 | 2.6% | 1.00 | 0.0% | 0.93 | 2.2% | 1.00 | 0.0% | 0.0% |
| 34 | 0.83 | 3.5% | 1.00 | 0.0% | 0.94 | 2.1% | 1.00 | 0.0% | 0.0% |
| 35 | 0.87 | 2.6% | 1.00 | 0.0% | 0.94 | 2.1% | 1.00 | 0.0% | 0.0% |
| 36 | 0.82 | 3.7% | 1.00 | 0.0% | 0.95 | 1.7% | 1.00 | 0.0% | 0.0% |
| 37 | 0.87 | 2.7% | 1.00 | 0.0% | 0.94 | 2.1% | 1.00 | 0.0% | 0.0% |
| 38 | 0.82 | 3.7% | 1.00 | 0.0% | 0.94 | 1.9% | 1.00 | 0.0% | 0.0% |
| 39 | 0.87 | 2.6% | 1.00 | 0.0% | 0.94 | 2.0% | 1.00 | 0.0% | 0.0% |
| 40 | 0.81 | 3.8% | 1.00 | 0.0% | 0.85 | 5.1% | 1.00 | 0.0% | 0.0% |

TABLE 4: THE $h$-max RATIO ($h$) AND MAXIMUM SCALING FACTOR ($s_{max}$) FOR VARIOUS $d$ AND $k$-MEANS KERNELS

FIG. 9

|   | k=100 | | | | | k=400 | | | | |
|---|---|---|---|---|---|---|---|---|---|---|
| d | CPU | CPU SMART | FIXED | FIXED SMART | SMART | CPU | CPU SMART | FIXED | FIXED SMART | SMART |
| 2 | 3,291 | (127x) | 59 | (2.26x) | 26 | 10,844 | (181x) | 118 | (1.97x) | 60 |
| 3 | 4,380 | (134x) | 64 | (1.97x) | 33 | 15,468 | (178x) | 143 | (1.64x) | 87 |
| 4 | 5,548 | (169x) | 69 | (2.09x) | 33 | 19,860 | (224x) | 160 | (1.81x) | 89 |
| 5 | 6,424 | (154x) | 73 | (1.76x) | 42 | 22,857 | (185x) | 179 | (1.45x) | 123 |
| 6 | 7,018 | (166x) | 78 | (1.83x) | 42 | 25,732 | (198x) | 195 | (1.50x) | 130 |
| 7 | 7,903 | (162x) | 83 | (1.69x) | 49 | 29,390 | (174x) | 212 | (1.26x) | 169 |
| 8 | 8,896 | (187x) | 87 | (1.83x) | 48 | 33,416 | (211x) | 227 | (1.43x) | 158 |
| 9 | 10,532 | (206x) | 92 | (1.79x) | 51 | 38,528 | (225x) | 245 | (1.43x) | 171 |
| 10 | 10,868 | (189x) | 97 | (1.68x) | 58 | 41,312 | (197x) | 261 | (1.24x) | 210 |
| 11 | 11,685 | (200x) | 101 | (1.73x) | 59 | 43,802 | (203x) | 278 | (1.28x) | 216 |
| 12 | 12,695 | (203x) | 106 | (1.69x) | 63 | 47,833 | (204x) | 292 | (1.25x) | 234 |
| 13 | 14,012 | (211x) | 111 | (1.66x) | 67 | 51,306 | (209x) | 309 | (1.26x) | 245 |
| 14 | 14,823 | (210x) | 115 | (1.63x) | 71 | 54,152 | (196x) | 325 | (1.18x) | 276 |
| 15 | 15,495 | (201x) | 120 | (1.55x) | 77 | 57,300 | (210x) | 342 | (1.25x) | 273 |
| 16 | 16,282 | (209x) | 122 | (1.57x) | 78 | 61,048 | (173x) | 354 | (1.00x) | 354 |
| 17 | 17,193 | (199x) | 129 | (1.49x) | 87 | 63,757 | (171x) | 374 | (1.00x) | 374 |
| 18 | 18,946 | (214x) | 134 | (1.51x) | 89 | 69,849 | (179x) | 390 | (1.00x) | 390 |
| 19 | 19,693 | (211x) | 139 | (1.49x) | 93 | 74,677 | (184x) | 407 | (1.00x) | 407 |
| 20 | 20,627 | (214x) | 142 | (1.47x) | 97 | 77,763 | (185x) | 421 | (1.00x) | 421 |
| 21 | 21,512 | (208x) | 148 | (1.43x) | 103 | 80,941 | (185x) | 439 | (1.00x) | 439 |
| 22 | 22,441 | (216x) | 152 | (1.46x) | 104 | 84,209 | (185x) | 454 | (1.00x) | 454 |
| 23 | 23,068 | (204x) | 157 | (1.38x) | 113 | 87,651 | (186x) | 471 | (1.00x) | 471 |
| 24 | 23,951 | (206x) | 159 | (1.37x) | 116 | 90,645 | (187x) | 484 | (1.00x) | 484 |
| 25 | 24,721 | (198x) | 166 | (1.33x) | 125 | 94,230 | (187x) | 503 | (1.00x) | 503 |
| 26 | 25,879 | (203x) | 170 | (1.33x) | 128 | 97,577 | (188x) | 519 | (1.00x) | 519 |
| 27 | 26,467 | (201x) | 175 | (1.33x) | 132 | 100,673 | (188x) | 534 | (1.00x) | 534 |
| 28 | 27,160 | (206x) | 179 | (1.36x) | 132 | 104,966 | (191x) | 551 | (1.00x) | 551 |
| 29 | 28,093 | (191x) | 184 | (1.25x) | 147 | 106,986 | (189x) | 567 | (1.00x) | 567 |
| 30 | 29,245 | (197x) | 189 | (1.27x) | 149 | 110,532 | (189x) | 584 | (1.00x) | 584 |
| 31 | 29,880 | (181x) | 194 | (1.18x) | 165 | 113,462 | (190x) | 599 | (1.00x) | 599 |
| 32 | 30,571 | (197x) | 191 | (1.23x) | 155 | 117,216 | (193x) | 607 | (1.00x) | 607 |
| 33 | 31,200 | (153x) | 247 | (1.21x) | 204 | 120,029 | (173x) | 693 | (1.00x) | 693 |
| 34 | 32,082 | (163x) | 243 | (1.24x) | 196 | 123,697 | (177x) | 698 | (1.00x) | 698 |
| 35 | 33,049 | (156x) | 257 | (1.21x) | 212 | 126,337 | (173x) | 732 | (1.00x) | 732 |
| 36 | 33,770 | (168x) | 250 | (1.24x) | 201 | 129,711 | (169x) | 765 | (1.00x) | 765 |
| 37 | 34,451 | (157x) | 267 | (1.21x) | 220 | 133,401 | (161x) | 828 | (1.00x) | 828 |
| 38 | 35,401 | (169x) | 266 | (1.27x) | 209 | 136,042 | (153x) | 887 | (1.00x) | 887 |
| 39 | 36,167 | (158x) | 281 | (1.22x) | 229 | 139,258 | (153x) | 913 | (1.00x) | 913 |
| 40 | 36,993 | (167x) | 265 | (1.19x) | 222 | 142,486 | (151x) | 941 | (1.00x) | 941 |

TABLE 5: TIMING RESULTS (IN MILLISECONDS) OF CPU, FIXED-KERNEL GPU, AND SMART-KERNEL GPU k-MEANS

FIG. 12

SYSTEM AND METHOD FOR HIGH PERFORMANCE K-MEANS CLUSTERING ON GPU WITH SMART KERNELS

BACKGROUND

The following exemplary embodiments relate generally to improved operational efficiency of graphics processing units (GPUs), including GPUs employed in systems for data searching, retrieval, organization, interpretation and implementation. The embodiments more particularly find application in connection with systems and methods for conducting searches of electronically stored data, including but not being limited to datasets.

Graphics processing units (GPUs) are becoming increasingly popular in solving computationally challenging problems including but not limited to data mining problems and machine learning operations. With attention to computational complex problems, the k-means algorithm is a well-known clustering algorithm with many applications, including its use in the area of data mining. It is an iterative algorithm in which a single iteration consists of two phases:

1 Assignment phase: Each data point is assigned to one of the k clusters that is the closest in terms of the Euclidean distance between the point and the centroid of the cluster;
2 Update phase: Update all k cluster centroids by computing the arithmetic mean of each cluster.

The assignment phase and the update phase iterations are then repeated until an acceptable clustering of the data points is accomplished.

To find the initial centroids before the assignment phase of the first iteration can begin, two common initialization methods can be used: (a) the Forgy method, which randomly picks k points from the data and uses them as the initial centroids; and (b) the Random Partition method, which randomly assigns each point to a cluster, updates the cluster centroids, and uses the updated centroids as initial centroids. Both initialization methods are supported by the teachings of the present disclosure.

A number of data mining algorithms have been developed as GPU-based k-means clustering algorithms. Most of these existing GPU-based k-means implementations have been built on top of a parallel computing platform and programming model developed by NVIDIA Corporation of Santa Clara, Calif., called CUDA, which supports general-purpose GPU computing. While the embodiments to be described herein (including k-means clustering) also use CUDA, the present focus is on the more recent NVIDA GPUs designed with the Fermi architecture, rather than the earlier models such as GeForce GTX 280 that has been used as the test GPU in a number of studies such as discussed in the article by Ren Wu, Bin Zhang, and Meichum Hsu, GPU-Accelerated Large Scale Analytics, HP Laboratories, Hewlett-Packard Development Company, L.P. (Mar. 6, 2009).

The introduction of the Fermi architecture has resulted in several new features being added to CUDA that were not previously available. This creates new opportunities for improving existing GPU-based algorithms implemented for and tested on pre-Fermi GPUs. For example, the article by R. Nath, S. Tomov, J. Dongarra, An Improved Magma Gemm for Fermi Graphics Processing Units, International Journal of High Performance Computing Applications 2010, shows how to improve general matrix-matrix multiplications on the Fermi GPUs, which require non-trivial implementation changes to fully exploit the newly introduced hardware features such as increased shared memory, number of registers and etc.

The present inventor has determined additional aspects now available due to the Femi architecture permit for improvements in the operational efficiency of Fermi based and post-Fermi based GPUs.

INCORPORATION BY REFERENCE

Applicant hereby incorporates U.S. patent application Ser. No. 14/275,382, Titled: SYSTEM AND METHOD FOR TESTING AND SELECTING USEFUL SMART KERNELS FOR GENERAL-PURPOSE GPU COMPUTING, by reference in its entirety herein.

BRIEF DESCRIPTION

In accordance with one aspect of an exemplary embodiment, a method is provided for performing a k-means clustering algorithm using a graphics processing unit (GPU) to perform operations on an electronically stored dataset. A set of k-means GPU kernels are identified, and the k-means GPU kernels include (i) k-means GPU assignment kernels and (ii) k-means GPU update kernels. A set of test dimensions are identified. A set of test numbers of clusters are identified. A test problem is created for each combination of the test dimensions and the test numbers of clusters. An assignment or update k-means GPU kernel is labeled as a k-means GPU assignment α-kernel or update α-kernel if and only if it achieves the best performance among all the k-means GPU assignment or update kernels tested for at least one combination of the test dimensions and the test numbers of clusters. Once a set of k-means GPU assignment and update α-kernels are determined, an electronic table or file is written that records (i) the set of assignment and update α-kernels discovered and (ii) the best assignment and update α-kernels for each combination of the test dimensions and the test numbers of clusters, such that already-tested kernel and parameter combinations do not have to be tested again on the same GPU hardware. An intelligent kernel selection algorithm is applied to the set of the identified α-kernels to (i) select one of the k-means GPU assignment α-kernels as the assignment kernel for a given number of dimensions and a given number of clusters, and (ii) select one of the k-means GPU update α-kernels as the update kernel for a given number of dimensions and a given number of clusters. Then, (i) the selected assignment α-kernel is applied to perform an assignment phase of the k-means algorithm, and (ii) the selected update α-kernel is applied to perform an update phase of the k-means algorithm, for problems having the same number of dimensions and the same number of clusters. The applying of the assignment α-kernel and the update α-kernel is repeated until cluster centroids assigned to the clusters reach an accepted state.

In another aspect at least one of the k-means assignment GPU kernels accesses the cluster centroids stored in a global memory of the GPU without first loading the cluster centroids into a shared memory of the GPU, and the at least one k-means assignment GPU kernel is further configured to prefer a L1 cache of the GPU over the shared memory of the GPU.

In another aspect at least one of the k-means assignment GPU kernels loads the cluster centroids of at least some of the clusters into a shared memory of the GPU, and the at least one k-means assignment GPU kernel is configured to prefer the shared memory of the GPU over L1 cache of the GPU.

In another aspect implementing the at least one k-means assignment GPU kernel, further includes performing a loop unrolling technique that eliminates if-statements in order to unroll a centroid-enumeration loop.

In another aspect at least one k-means update GPU kernel updates the cluster centroids stored in a global memory of the GPU without first loading the cluster centroids into a shared memory of the GPU, and the at least one k-means update GPU kernel is configured to prefer a L1 cache of the GPU over the shared memory of the GPU.

In another aspect at least one k-means update GPU kernel updates cluster centroids stored in a shared memory of the GPU, and writes out updated cluster centroids to a global memory of the GPU, and wherein the at least one k-means update GPU kernel is configured to prefer the shared memory of the GPU over a L1 cache of the GPU.

In another aspect at least one of the k-means GPU kernels is configured to bind input data stored in a global memory of the GPU to a texture memory of the GPU, when a number of floats encoding the input data is less than a hardware limit for a 1D texture memory of the GPU.

In another aspect at least one k-means assignment GPU kernel includes input data which is bound to texture memory.

In another aspect at least one k-means update GPU kernel has input data bound to texture memory.

In another aspect, a graphics processing unit (GPU) based k-means clustering system is configured to perform the k-means operations.

Another aspect of the system is wherein the GPU includes a plurality of GPUs.

In another aspect of the exemplary embodiment, the method includes the use of at least one of (i) rule-based, (ii) on-line, and (iii) hybrid smart-kernel selection strategy.

Another aspect of the method is having the k-means clustering algorithm be one of a data mining algorithm or a machine learning algorithm.

BRIEF DESCRIPTION OF THE DRAWINGS

FIG. 6 is a table depicting the timing results in milliseconds, for various k-means assignment kernels according to testing of the present concepts;

FIG. 7 depicts a timing table showing results in milliseconds for various k-means update kernels;

FIG. 8 depicts a victory statistics table for various k-means α-kernels;

FIG. 9 is a table for a small h-max ratio (h) and maximum scaling factor ($s_{max}$) for various d and k-means kernels;

FIG. 12 depicts timing results in milliseconds for CPU operation with a fixed-kernel GPU and smart-kernel GPU k-means.

DETAILED DESCRIPTION

Figure 1:
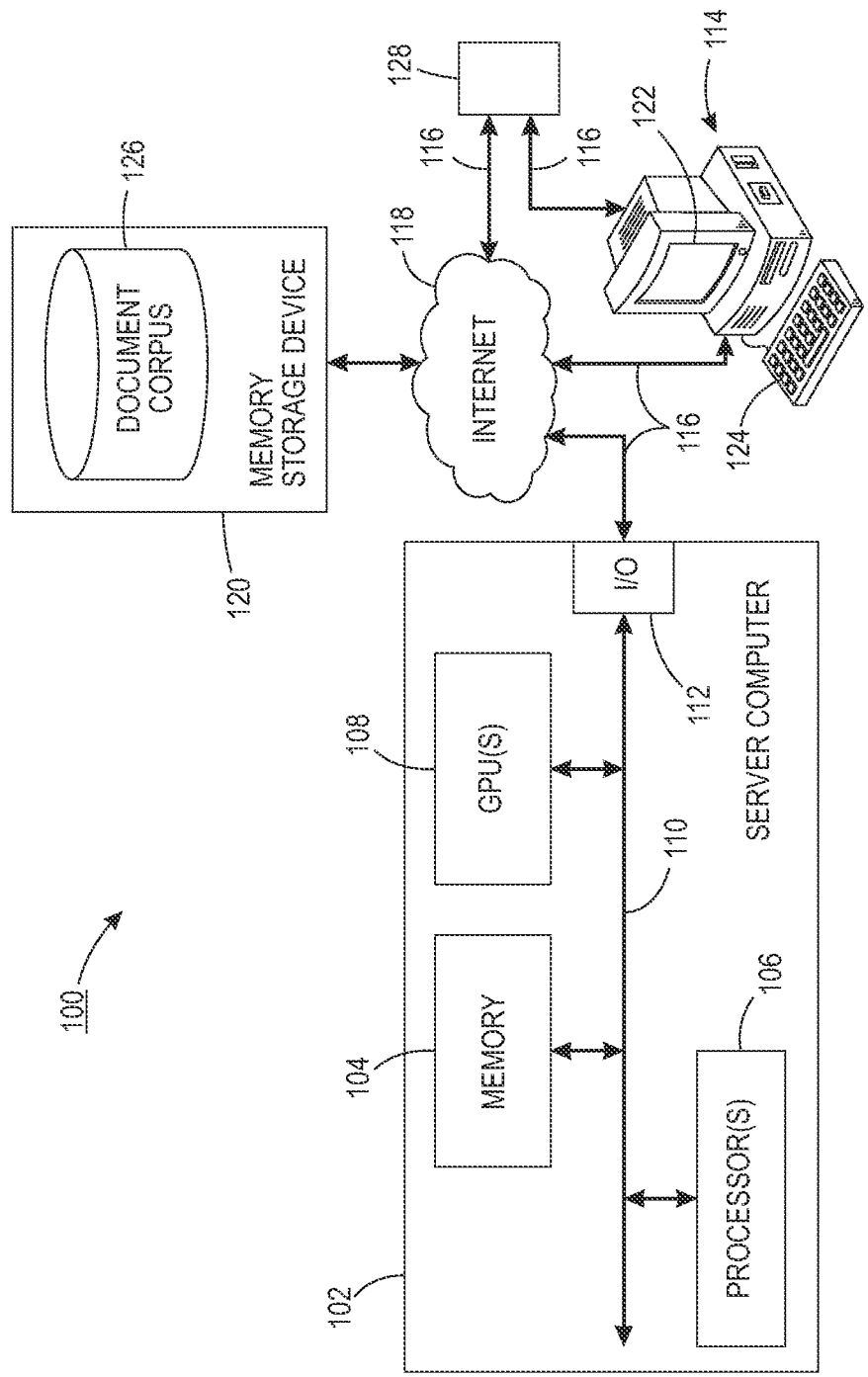
FIG. 1 is a schematic of an exemplary system which may implement the concepts of the present application.

The present disclosure describes methods and systems for testing and selecting useful smart kernels for particular parameters for general-purpose graphics processing unit (GPU) computing, to improve the efficiency of the GPUs. The disclosure also provides an embodiment related to a high performance implementation of a k-means clustering algorithm on a graphics processing unit (GPU) by leveraging a set of GPU kernels with complementary strengths for datasets of various parameters, such as dimensions and different numbers of clusters. It is to be appreciated that while an embodiment herein focusses on a k-means implementation the described concepts can be used for other data-mining algorithms, and are also applicable to other areas such as but not limited to machine learning.

The use of the term complementary strengths and/or complementary alone is understood to express that GPU kernels in a GPU set have some type of related function or functions to other kernels of the set. Also, the parameters and parameter values terminology represent specific aspects of the problem being solved. For example in a k-means clustering implementation the parameters, would be the dimensions (d), and clusters (k) of the dataset of the associated problem, with parameter values including the identified number of dimensions and the identified number of clusters of the dataset of the problem. It is to be appreciated the foregoing are simply examples and other problems and associated datasets can be defined by aspects representing other parameters and parameter values.

As an overview of the present discussion, it has been mentioned the Fermi based GPUs include a number of changes from previous GPU versions. One particular change brought by the Fermi GPU is the introduction of a memory hierarchy with multiple levels of cache. This means reads and writes to global memory, the largest and the slowest type of memory on the GPU, are cached in units of the size of a cache line. In addition, each streaming multiprocessor (SM), which is the part of the GPU that runs CUDA code in parallel, has 64 KB fast on-chip memory that can be split between shared memory and L1 cache. By default, 48 KB is reserved for shared memory accessible by all threads in the same thread block, and the remaining 16 KB is reserved for L1 cache. However, it is possible to have this configured the other way around, i.e., a 16 KB shared memory/48 KB L1 cache split, by a simple CUDA API call such as:

cudaDeviceSetCacheConfig(cudaFuncCachePreferL1);

All CUDA-enabled GPUs, including pre-Fermi versions, come with 64 KB of constant memory, which is commonly used to store read-only data such as the centroids for the assignment phase of k-means. Unlike previous work, the to be described implementations do not use constant memory for storing the centroids of a clustering operation, because the cache working set per SM for constant memory is only 8 KB, which is quite limited. Instead, shared memory is used to store the centroids, if they all fit in 48 KB; otherwise global memory or texture memory is used to store these centroids. In pre-Fermi GPUs, texture memory is cached, and thus it can be faster than global memory, which is not cached. However, with Fermi's introduction of L1 and L2 cache for global memory, the performance gap has been reduced between these two types of memory. While generally using texture memory may be more desired, as will be shown later, it is not always better to choose texture memory over global memory.

Additionally, for pre-Fermi GPUs, the concept of memory coalescing is important for achieving good performance. Memory accesses are considered coalesced if consecutive threads are accessing consecutive memory cells. For example, if thread 0 is accessing memory address 0x0000, and at the same time thread 1 is accessing address 0x0004, thread 2 0x0008, and so on, then these accesses will be coalesced into a single memory transaction, up to 16 threads in the same group of 32 hardware threads, which is called a warp in CUDA terminology. However, memory coalescing becomes less critical to Fermi and post-Fermi GPUs, due to the existence of the L1 and L2 caches. As long as adjacent threads access memory cells on the same cache line, the size of which is typically 128 bytes, the number of global memory transactions can be significantly reduced. In other words, memory access locality replaces memory access coalescence as a performance-impacting factor for the newer Fermi and post-Fermi based GPUs. To take advantage of this, the to be described k-means implementation works directly with data stored in a row-based format, which stores coordinates of the same point consecutively. Previous implementations of k-means such as the previously mentioned, Ren Wu, Bin Zhang, and Meichum Hsu, GPU-Accelerated Large Scale Analytics, HP Laboratories, Hewlett-Packard Development Company, L.P. (Mar. 6, 2009) would need to first transpose the data stored in CPU, which is typically row-based, into a column-based format that stores the same $x^{th}$ coordinate of different points consecutively in the GPU, for memory coalescence purposes. Transposition of large datasets is not only time consuming but also space consuming. This can be particularly an issue for datasets that do not fit in the GPU memory, because either (1) the CPU has to keep two copies of the same data, one row-based and the other column-based; or (2) transposition has to be done once per iteration. Neither solution is appealing, although performing transposition (i.e., option (2)) on the GPU was deemed more acceptable by Ren Wu, Bin Zhang, and Meichum Hsu, GPU-Accelerated Large Scale Analytics, HP Laboratories, Hewlett-Packard Development Company, L.P. (Mar. 6, 2009). Thus, the ability to deal with row-based data directly is an advantage for the present k-means, especially for big datasets.

These and other features found in Femi based GPUs provide avenues to improve computational performance as will be expanded upon below.

In consideration to the above overview, attention is now turned to a more detailed discussion related to system aspects of the present disclosure. FIG. 1 illustrates an exemplary system 100 which may be used for performing investigations of datasets by the use of graphics processing unit (GPU) kernels, for operation on a graphics processing unit (GPU). The illustrated exemplary system 100 may be employed for a number of operations on datasets, including data mining operations, machine learning operations, among others.

System 100 includes one or more computing devices 102, which in some embodiments may be computer servers, computer workstations, portable computers, or node(s) having computing capabilities. The computing device 102 include a memory storage area 104, a processor or multiple processors (e.g., CPUs) 106, one or more graphics processing units (GPU) 108. These components are linked by a data/control bus 110 to each other and to one or more input/output interfaces 112 for communicating with an external user and/or external devices, and for receiving query inputs from a user. The user may interact via the input-output area 112, which may be a keyboard, voice activation or other input-output technique that is directly associated with the computing device 102. Alternatively, a user may interact with system 100 via a user interface hosted by a client computing device 114. The client device 114 can be any of a number of computing devices such as a desktop computer, laptop computer, PDA, cell phone with internet capability or the like, and can be linked to the system 100 via a wired or wireless connection 116, such as a local area network or worldwide area network, such as the internet 118. Such connections also connecting a remote memory storage device 120. The client computing device 114 may include a monitor or display 122 and an input component 124. It is to be appreciated these elements may also be part of the input-output area 112 of the computing device 102. As also shown, the connection to the Internet 118 permits the system 100 to access datasets 126 that are external of the computing device 102, as well as datasets found in the memories of the memory storage area 104, the processor 106 and GPU 108.

The memory storage area 104 of system 100 can include random access memory (RAM), read-only memory (ROM), a hard disc, an optical disc, a combination thereof and the like, and may be physically located in the same computing device, or parts thereof may be accessible to the computing device, e.g., via a local area network or the internet.

Additionally, processor 106 can be variously embodied, such as by a single-core processor, a dual-core processor (or more generally by a multiple-core processor), a digital processor and cooperating math coprocessor, a digital controller, or the like.

The display 122, may in certain embodiments be an LCD screen or computer monitor and the user input device 124 for entering a query e.g., by typing or voice input, and for selecting refinements to the query. Suitable input devices 124 may include a keyboard, keypad, touch screen, cursor control device, microphone and voice to text converter, or combination thereof. It is understood the input-output area 112, may in certain embodiments also include such elements. Also depicted in FIG. 1 is an external component 128, which in certain embodiments may be a printer and/or controller, and which is shown with communication paths to the client computing device 114 and the internet 118. When embodied as a printer, hardcopy outputs may be generated of data produced by the system. When embodied as a controller, control instructions generated by the client computer 114 may, for example, based on problem solutions generated in-line with the present teachings may be output to external environments (e.g., based on a problem solution instructions may be issued such as to a factory to control operations, among numerous other environments).

Turning to FIG. 2A through FIG. 5, additional details of the Fermi GPU architecture and the CUDA platform are described.

The CUDA platform permits NVIDIA designed GPUs to execute programs written with C, C++, Fortran, OpenCL, DirectCompute, as well as other languages. A CUDA program is designed to call implemented kernels. Such a kernel executes in parallel across a set of parallel threads. The programmer or compiler will organize the threads in thread blocks and grids of thread blocks. The GPU will instantiate a kernel program on a grid of parallel thread blocks. Each thread within a thread block executes an instance of the kernel, and each thread will have a thread ID within its thread block, program counter, registers, per-thread private memory, inputs, and output results.

Figure 2A:
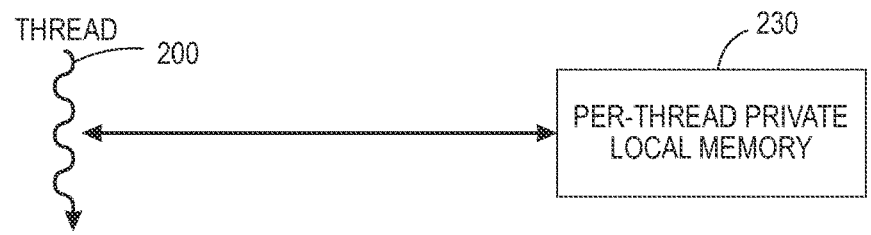
FIGS. 2A-2C depict a hierarchy of threads, blocks and grids, with corresponding pre-thread private, per block shared, and per application global memory spaces.
Figure 2B:
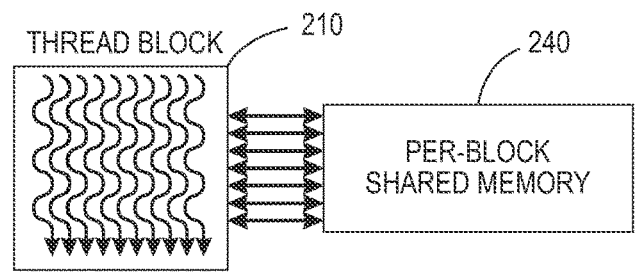
Figure 2C:
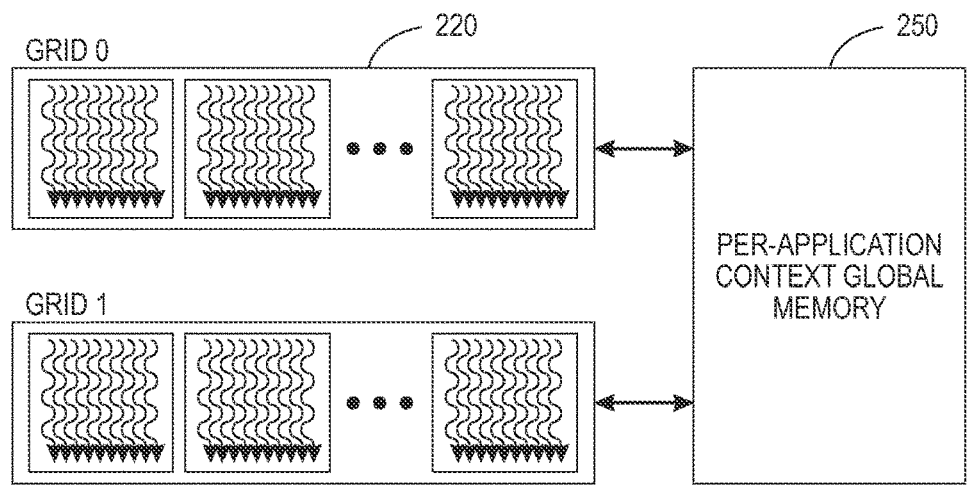

FIGS. 2A-2C depict a CUDA hierarchy of threads 200, thread blocks 210, thread grids 220, with corresponding per-thread private memory 230, per-block shared memory 240, and per-application global memory spaces 250.

A thread block 210 is a set of concurrently executing threads 200 that can cooperate among themselves through barrier synchronization and shared memory.

A thread grid 220 is an array of thread blocks 210 that execute the same kernel, read inputs from global memory 250, write results to global memory, and synchronize between dependent kernel calls. In the CUDA parallel programming model, each thread with the per-thread private memory space 230 is used for register spills, function calls, and C automatic array variables. Each thread block 220 with the per-block shared memory space 240 is used for inter-thread communication, data sharing, and result sharing in parallel algorithms. The grids of thread blocks 220 share results in the global memory space 250 after kernel-wide global synchronization.

CUDA's hierarchy of threads maps to a hierarchy of processors on the GPU; where the GPU executes one or more kernel grids; a streaming multiprocessor (SM) executes one or more thread blocks; and CUDA cores and other execution units in the SM execute threads. The SM executes threads in groups of 32 threads called a warp.

Figure 3:
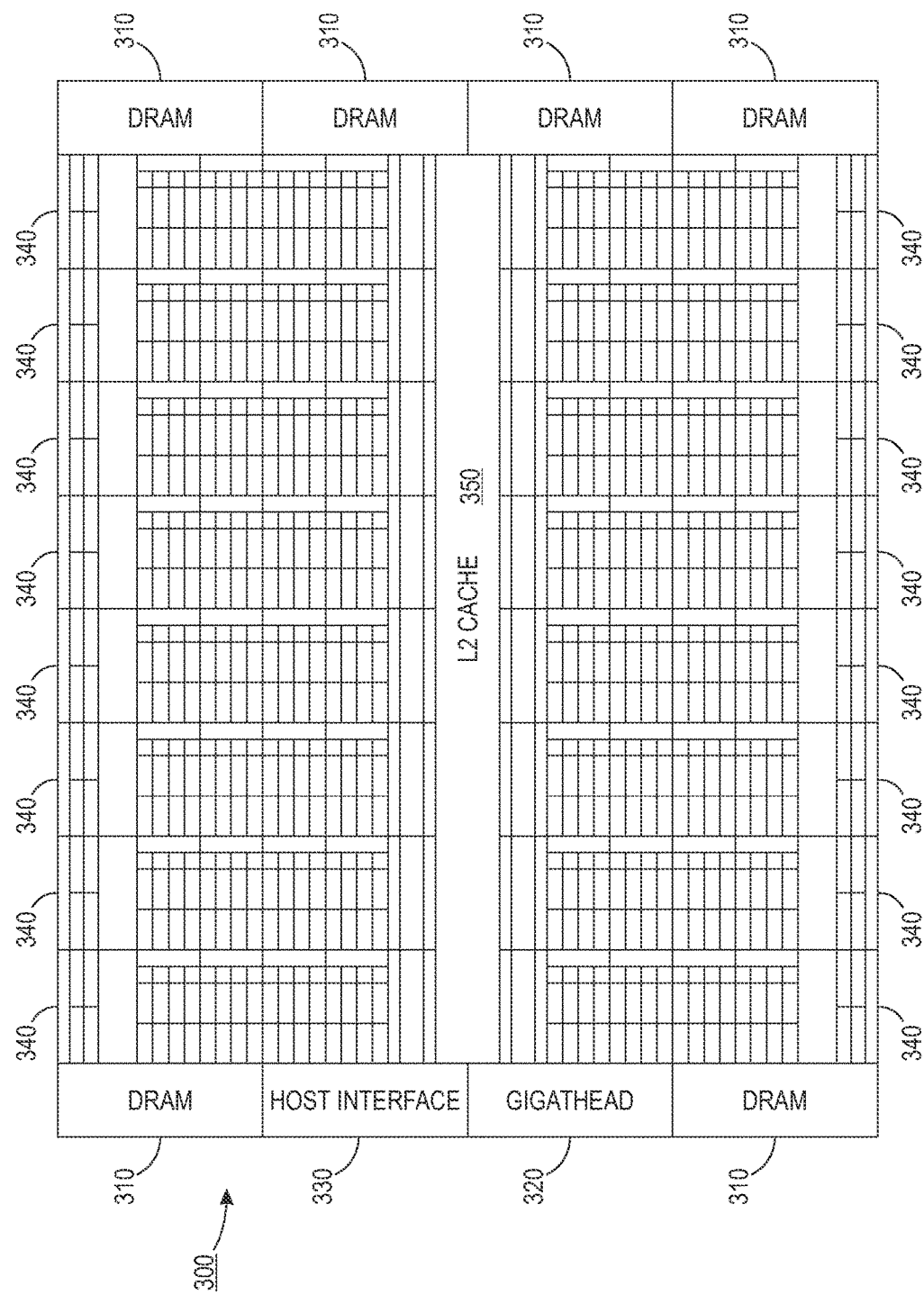
FIG. 3 depicts an overview of a Fermi GPU architecture.

Turning to FIG. 3, shown is an overview of the Fermi Architecture based GPU 300. Depicted are DRAMs 310, GigaThread global scheduler block 320, Host interface 330, and 16 streaming multiprocessors (SM) 340 positioned around a common L2 cache 350.

Figure 4:
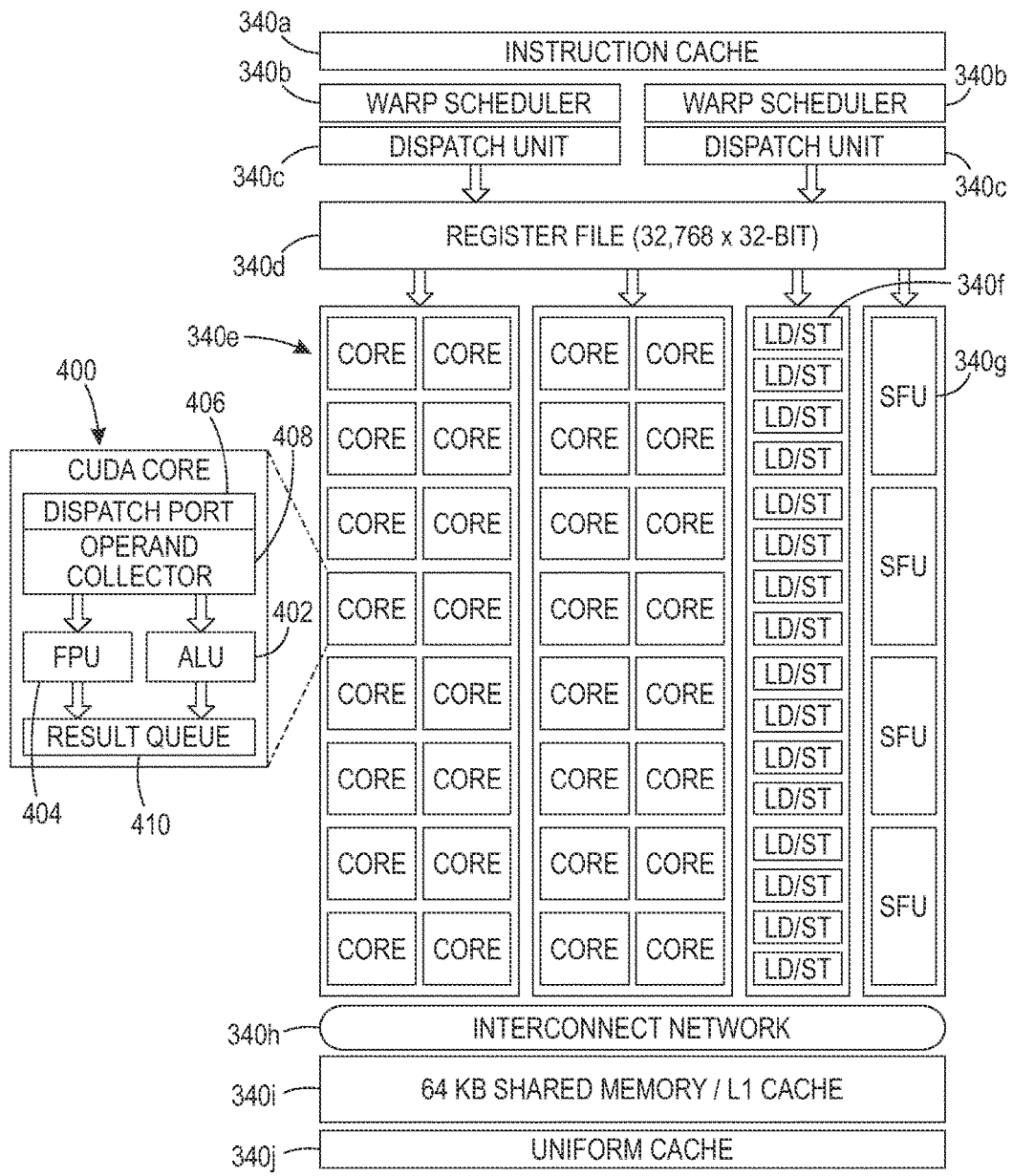
FIG. 4 depicts a single Fermi streaming multiprocessor with an exploded view of a CUDA core.

With attention to FIG. 4, an exemplary SM 340 of the group of 16 SMs of FIG. 3 is shown in more detail. SM 340 in FIG. 4, includes an instruction cache 340a, warp schedulers 340b, dispatch units 340c, register file 340d, execution units (or CUDA cores or processors) 340e, load/store units 340f, special function units 340g, an interconnect network 340h, L1 (shared cache) 340i, and L2 (uniform cache) 340j. A CUDA core 340e executes a floating point or integer instruction per clock for a thread. The 512 CUDA cores are organized in the 16 SMs of 32 cores each. The GPU has six 64-bit memory partitions, for a 384-bit memory interface, supporting up to a total of 6 GB of GDDR5 DRAM memory. The host interface 330 connects the GPU to an associated CPU via for example a PCI-Express. The GigaThread global scheduler 320 distributes thread blocks to SM thread schedulers.

With continuing reference to FIG. 4, each SM features 32 CUDA cores where one of the previously plurality of identified CUDA cores 340e, is shown by exploded CUDA core view 400, where each has a fully pipelined integer arithmetic logic unit (ALU) 402 and floating point unit (FPU) 404, operating in conjunction with a dispatch port 406, an operand collector area 408, and a result queue 410.

Each SM has 16 load/store units 340f, allowing source and destination addresses to be calculated for sixteen threads per clock. Supporting units load and store the data at each address to cache or DRAM.

Special Function Units (SFUs) 340g execute instructions such as sin, cosine, reciprocal, and square root.

Figure 5:
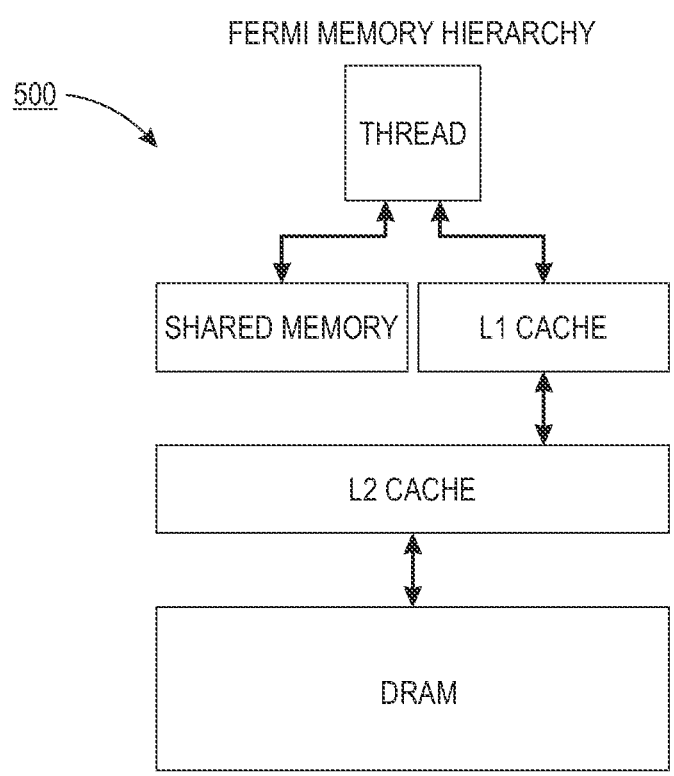
FIG. 5 depicts a Fermi memory hierarchy.

Turning to FIG. 5, illustrated is the Fermi memory hierarchy 500, which offers the benefits of both shared memory and cache, and allows a programmer a choice over partitioning. The Fermi memory hierarchy adapts to both types of program behavior.

The Fermi architecture thus implements a single unified memory request path for loads and stores, with an L1 cache per SM multiprocessor and unified L2 cache that services all operations (load, store and texture). The per-SM L1 cache is configurable to support both shared memory and caching of local and global memory operations. The 64 KB memory can be configured as either 48 KB of Shared memory with 16 KB of L1 cache, or 16 KB of Shared memory with 48 KB of L1 cache.

The present disclosure introduces a concept of non-dominated GPU kernels and efficient strategies to select a high-throughput kernel that, in one embodiment, matches the arguments of a clustering problem with the underlying GPU hardware for maximum speed-up. Computational results confirm the effectiveness of this approach. Thus, unlike previous work, which assumed the entire set of centroids fit in the constant memory limited to 64 KB, the present k-means can deal with much bigger amounts of data, as required by datasets with higher dimensions (d) or larger values of k, since the total size of the centroids grows linearly with either the dimensions of the data or the number of clusters. Furthermore, the performance of the k-means algorithm is optimized for a wide range of data dimensions.

Since the k-means algorithm alternates between the assignment phase and the update phase, the description of the GPU kernels used in the present k-means implementation follows the same order. A GPU kernel is a function that is applied to one or more elements in the dataset. Multiple instances of the same kernel function can run in parallel to take advantage of the processing power of modern GPUs.

Assignment Kernels:

Below is a list of assignment kernels that find an id of the nearest cluster for each point of data being investigated.

AG kernel: This assignment kernel accesses the centroids stored in global memory without loading them into shared memory, and thus it is configured to prefer L1 cache ("prefer" in this context is understood to mean a particular kernel to which it is associated requests the CUDA runtime to configure the SMs to have larger size of the noted preferred memory). Each kernel is responsible for processing a single row of the data, which is loaded into d on-chip registers, where d is the number of dimensions of a single point. After the point is loaded, the kernel computes the Euclidean distance to each of the k centroids, while keeping track of the id of the cluster with the minimum distance. In the end, the id of the minimum-distance cluster is written to an integer array stored in global memory that holds the result of the assignment phase. Since each thread is responsible for reading in an entire data row, consecutive threads will not access consecutive addresses, and thus reads are not coalesced, although they still exhibit good memory access locality, which is what really matters on Fermi GPUs. Because each thread only writes a single integer, the id of the nearest cluster, global memory writes are coalesced in this and all the other assignment kernels described next.

AS kernel: This assignment kernel loads all the centroids into shared memory, and thus it is configured to prefer shared memory, which is much faster than global memory. It uses a loading pattern that coalesces memory reads for the centroid coordinates. To amortize the overhead of loading, each kernel is responsible for processing multiple rows of the data. As in the AG kernel, a point with d dimensions is loaded into d on-chip registers, before its Euclidean distance to each of the k centroids is computed. Once the minimum-distance cluster for a point has been determined, the id of that cluster is written to global memory in a coalesced fashion.

ASU kernel: This assignment kernel is the same as the AS kernel, except that it unrolls the loop that enumerates the k centroids for computing the Euclidean distance to each of them. Addressed is the challenge of unrolling a loop whose loop count is unknown at compile time as follows: the set of k centroids is broken down into [k/16] groups, each having exactly 16 centroids, except for the last group. In a single iteration of the loop, the kernel finds the minimum-distance centroid among a group of 16 centroids. This reduces the loop count by a factor of 16, which can speed up the AS kernel due to increased instruction-level parallelism on the GPU. Of course, the kernel must handle the case in which the last group has fewer than 16 centroids, whenever k is not a multiple of 16. Normally, this can be done by either (a) checking the cluster id of each of the 16 centroids such that out-of-range centroids in the last group are skipped, or (b) using a separate, one-centroid-at-a-time loop to process the remaining k % 16 centroids. There are issues with both approaches. For (a), this introduces 16 if-statements to the body of the loop, which can slow down the kernel. For (b), it cannot produce fully unrolled loops, because the loop for the last k % 16 centroids is still not unrolled. Here is described a loop unrolling technique specifically designed for k-means that does not have these drawbacks.

For the ASU kernel, the present k-means implementation automatically creates 16−(k % 16) pseudo centroids with cluster ids $\in$[k+1, k+16−(k % 16)], if k % 16≠0. Their cluster ids are higher than the real centroids, which are in the range of [1, k]. These pseudo centroids are not stored in global memory, since they only live in shared memory for the duration of the ASU kernel. The pseudo centroids are initialized by the ASU kernel with a very large number in each and every of their dimensions, to make sure that none of the points would ever be assigned to any of the pseudo centroids. The purpose of creating these pseudo centroids is to make sure the last group has exactly 16 centroids, just like all the rest. This avoids the problem of needing special treatment for the last centroid group. It has the following appealing properties for k-means:

The centroid-enumeration loop is always unrolled, regardless of the number of centroids;
No if-statements are required.

The main overhead in this approach is space, and space required is usually quite modest, because even in the worst case where k % 16=1, only 15 pseudo centroids will be created. In the case of k being a multiple of 16, there is no need for any pseudo centroid, and thus the best-case space overhead is always zero (0).

The above loop unrolling technique for k-means can be applied to both GPUs and CPUs.

Update Kernels:

Following the assignment phase of the k-means implementation is the update phase, which is more challenging to parallelize, because it may require frequent writes to global data structures such as the centroids and the size of each cluster. Furthermore, since the mapping from points to their nearest clusters can be random, the memory access pattern is less predictable in the update phase. A divide-and-conquer strategy is used for this phase where each kernel is assigned a local update workspace that accumulates the sum of all the points assigned to the kernel for each cluster, and the size of the cluster. This is called a local update kernel, since it is responsible for only a subset of the points. This avoids the issue of global synchronization among the update kernels, at the cost of having multiple local update workspaces, each of which must be large enough to hold all the centroids and cluster sizes.

Below is a list of local update kernels that are used in the k-means implementation:

UG kernel: This kernel computes the sum of all the points assigned to it, as well as the sizes of each cluster, in global memory. Like the AG kernel, it is configured to prefer L1 cache. Each kernel is responsible for processing multiple rows of the data, such that the total number of kernel instances can be bounded from above by some constant. This is a sensible design choice, because limiting the number of local update kernels also limits the amount of global memory they need for their local update workspaces, and each workspace needs O(dk+k) space, where dk is for storing the centroids and k for storing the size of each cluster.

US kernel: The US kernel is the shared-memory version of the UG kernel, and as such, it is configured to prefer shared memory. This kernel is applicable when the set of centroids and cluster size counters fit in shared memory. As a result, the accumulation of the sum of points for each cluster and their sizes is done all in shared memory, although each point still needs to be read from global memory. At the end of computation, the kernel writes the point sums and cluster sizes to global memory in a coalesced fashion.

After the local update kernels are completed, launched is a final, global update kernel that computes the grand sums of all the points in each cluster and the grand size of each cluster by summing over the local update workspaces, and then updates the centroids by computing their new arithmetic means. Since the amount of computation performed by the global update kernel is insignificant compared to the local update kernels, the present design for this kernel focuses on generality rather than performance. Thus, it uses (mostly) global memory to compute various sums and arithmetic means, because using global memory lets us accommodate the widest range of data dimensions (d) and number of clusters (k).

Using Texture Memory:

Since the introduction of the first CUDA-enabled GPU, texture memory has been an integral part of general-purpose GPU computing, as it is commonly used to provide cached access to large amounts of constant data. As mentioned earlier, the advantage of texture memory over global memory is reduced in Fermi with the inclusion of L1 and L2 cache. Nevertheless, there is still benefit of using texture memory, as the experiments have shown.

Unlike previous work such as the previously mentioned, Ren Wu, Bin Zhang, and Meichum Hsu, GPU-Accelerated Large Scale Analytics, HP Laboratories, Hewlett-Packard Development Company, L.P. (Mar. 6, 2009), that uses texture memory to access centroids; which is used to access the data points, which are immutable. On the other hand, because centroids are mutable in the update phase, they cannot be accessed through read-only texture memory in the same phase.

As long as the number of floats (not the number of bytes) encoding the data points is less than the maximum 1D texture hardware limit, which is currently $2^{27}$=134,217,728 floats for Fermi GPUs, every kernel in the present k-means has two ways of accessing the row data, either (a) through global memory, or (b) through texture memory. The changes required for (b) are the following:

Call cudaBindTexture( ) to bind the array that stores the data points to texture memory;

Use tex1Dfetch( ) to access the data as a one-dimensional array of floating point numbers;

Call cudaUnbindTexture( ) to unbind the data from texture memory at the end of computation.

If considered is the texture-memory option of the k-means kernels, then there are 6 assignment kernels and 4 local update kernels, as follows:

AG: Assign with centroids stored in Global memory;
AGT: Assign with centroids stored in Global memory, bind data to Texture;
AS: Assign with centroids stored in Shared memory;
AST: Assign with centroids stored in Shared memory, bind data to Texture;
ASU: Assign with centroids stored in Shared memory, Unroll loop
ASUT: Assign with centroids stored in Shared memory, Unroll loop, bind data to Texture;
UG: Update with local workspace stored in Global memory;
UGT: Update with local workspace stored in Global memory, bind data to Texture;
US: Update with local workspace stored in Shared memory;
UST: Update with local workspace stored in Shared memory, bind data to Texture.

Since any of the 6 assignment kernels may be used in combination with any of the 4 local update kernels, this gives rise to 24 different kernel combinations in this example, and the present k-means implementation faces the problem of finding the best combination to execute on the GPU.

Useful Kernels:

The potential design space for the k-means kernels is larger than the above list of 10 kernels. For example, one could in principle introduce other kernels to the list, such as AGU: Assign with centroids stored in Global memory, Unroll loop;
AGUT: Assign with centroids stored in Global memory, Unroll loop, bind data to Texture.

However, experiments for this embodiment have indicated that these two kernels performed poorly compared to the other 10 kernels described earlier, and thus their performance in the results section is not shown.

In general, extra kernels may not be useful if their performance is always dominated by existing kernels that have already been included. Given a set of kernel functions F, a kernel function $f$ is useful with respect to F, if and only if there exists some input data $i \in I$ such that, $perf(f, i)$, the performance (perf) of kernel function $f$ with respect to input data i, is the best among all the kernels in F. A kernel is called an α-kernel if it is useful. Let α (F) be the set of α-kernels in F, one has $f \in \alpha(F)$ iff $$\forall f' \neq f \in F, \exists i \in I, perf(f,i) > perf(f',i)$$

Any input data i for which $f$ attains the best performance in F is called a witness of $f$, denoted as $\omega(f)$. Let $\Omega(f) = \{\omega(f)\}$ be the set of witness data for $f$. An α-kernel must have at least one witness, that is, $$f \in \alpha(F) \Leftrightarrow \Omega(f) \neq \phi$$

In practice, finding the entire set $\Omega(f)$ can be difficult, since it requires the enumeration of all input data, which may not always be feasible. However, finding a single witness of $f$ can be much easier. Most of the witnesses of the present α-kernels were found by using $d \in [2, 10]$ and $k \in \{100, 400\}$, although some required $d \in [33, 39]$ to witness their best performances. Assuming no two kernel functions have the same performance with respect to all input data, it is easy to show that the set of α-kernels, α(F), is unique and only depends on F and the performance metric (e.g., speed). For high-performance k-means, speed is used as the sole performance metric in the experiments. Thus, $perf(f, i) > perf(f', i)$, if and only if wall-clock$(f, i) <$ wall-clock$(f', i)$, where wall-clock$(f', i)$ is the wall-clock time it takes for kernel $f$ to process input data i.

In applications where space is important, one can define a performance metric that considers either (a) only the memory consumption or (b) a combination of space and speed performance metrics, e.g., by using a linear combination of both. In general, as long as all the performance metrics can be summarized into a single scalar, the above definition of α-kernels can be applied to arbitrary algorithms that use GPUs (or even CPUs) including but not limited to performance-critical or performance-related computation and applications.

In the case of a multi-objective performance metric (e.g., of multiple evaluation criteria) that cannot be effectively summarized into a single number, the concept of α-kernels is still applicable, with the following extension. Let P be a set of performance metrics, and let perf(f, i, p) be a function that returns the performance score of kernel $f$ with respect to input data i on performance metric p, in which a higher score indicates higher performance on the same metric and scores on different metrics are not comparable. Furthermore, scores on difference input datasets need not to be comparable, because the performance of kernels may only be compared on the same input. One says a kernel $f$ is useful, iff $$\forall f' \neq f \in F, \exists i \in I, \exists p \in P, perf(f,i,p) > perf(f',i,p)$$

With the above extension, the set of α-kernels α(F, P) for a given combination of F and P becomes well-defined, for both single-objective (i.e., |P|=1) and multi-objective (i.e., |P|>1) performance metrics.

In practice, the sets of F and P are usually quite small. Thus, a manner to computing α(F, P) efficiently is to avoid explicitly enumerating all input data $i \in I$, even if the set of all input data is enumerable and finite. For k-means, one can leverage the fact the relative performance of a kernel is only sensitive to a small number of arguments including d and k, but not particularly to the actual content of the data. There are other arguments such as the number of rows and the number of iterations that would affect the absolute performance of various k-means kernels, but fortunately these rarely change the relative performance ranking of the kernels, which is what matters in computing α(F, P). Thus, although the set of input data is infinite for k-means, one only needs to enumerate or sample the 2D argument space formed by d and k for the sake of determining α(F, P). For typical ranges of $d \in [1, 40]$ and $k \in [1, 400]$, only 16K combinations need to be tested and if it takes on average one second to test each d-k combination, then the joint d-k argument space can be enumerated and tested in less than 4.5 hours on a single GPU, or less than an hour with 5 GPUs, since all tests can run in parallel.

According to the present experiments, the relative performance ranking of various k-means kernels is stable between two different models of Fermi GPUs, namely GTX 480 and GTX 580. Thus, it is conjectured that re-ranking of the present k-means kernels is only needed for a new GPU architecture, but not necessarily for each new GPU under the same or similar architecture. There is usually a two-year period between successive releases of new GPU architectures. This re-ranking can also employ the concepts described herein for GPUs with new GPU architectures.

Computational Results:

The performance of various k-means kernels have been tested on datasets of different d and k. To keep it simple, all datasets have exactly 1 million rows (i.e., data points) and the number of iterations is ten (10). All timing results are in milliseconds. To save space, only detailed results are shown for d∈[2, 40] and k∈{100, 400} on a GTX 580 GPU. Experiments have also been undertaken with GTX 480, whose performance on k-means supports the same conclusion. In particular, the relative performance ranking of different kernels on various input data is exactly the same for both GTX 480 and 580.

First, with attention to Table 1 of FIG. 6 presented are the timing results for the previously described assignment kernels. Of the six (6) assignment kernels proposed, five (5) were found to be α-kernels. The assignment kernel not shown in Table 1 is the AG kernel, which was found to be dominated by at least one of the other five (5) assignment kernels for all values of d and k tested, although the dominating kernels are not always the same. The best timing result for every pair of d and k is highlighted in bold. The cells labeled MEM correspond to the cases where 48 KB of shared memory are not big enough to store all the centroids. The columns labeled max/min show the ratio of timing results between the slowest kernel and the fastest kernel. For example, the slowest kernel for d=2 and k=400 is the AS kernel, which took 77 milliseconds; whereas the fastest kernel for the same dataset is the ASU kernel, which took 42 milliseconds. The timing ratio between these two kernels is 182%, indicating the fastest kernel is about 1.8× faster than the slowest kernel for this particular dataset. The average speed ratio between the fastest and the slowest kernel is about 132% in Table 1.

Next, as shown in Table 2 of FIG. 7, presented are the timing results for the local update kernels. Of the four (4) update kernels proposed, three (3) were found to be α-kernels. The update kernel not shown in Table 2 is the UG kernel, which was found to be dominated by at least one of the other three (3) update kernels for all values of d and k tested, although the dominating kernels are not always the same. The best timing result for every pair of d and k is highlighted in bold. The cells labeled MEM correspond to the cases where 48 KB of shared memory are not big enough to store all the centroids and the sizes of all the clusters. The columns labeled max/min show the ratio of timing results between the slowest kernel and the fastest kernel. For example, the slowest kernel for d=16 and k=400 is the UST kernel, which took 153 milliseconds; whereas the fastest kernel for the same dataset is the UGT kernel, which took 58 milliseconds. The timing ratio between these two kernels is 262%, indicating the fastest kernel is about 2.6× faster than the slowest kernel for this particular dataset. The average speed ratio between the fastest and the slowest kernel is about 212% in Table 2.

Turning to Table 3 of FIG. 8 shows the victory statistics for all the α-kernels measured in terms of the number of times a particular k-means α-kernel performs the best among all its competitors for d∈[2, 40] in Tables 1 and 2. The first five (5) rows show the victory statistics for the assignment kernels, and the last three (3) are for the update kernels. For example, the first row shows the AGT kernel is not the best-performing assignment kernel for any of the datasets with d∈[2, 40], if k=100; but the same kernel beats all the other assignment kernels for 25 different values of d, if k=400. The last row shows the UST kernel is the best-performing update kernel for seven (7) different values of d, if k=100; but the same kernel loses to at least another update kernel for all d∈[2, 40], if k=400. The last column of Table 3 shows the total number of victories for each kernel by adding up the "k=100" and "k=400" columns. While Table 3 is based on experiments conducted on a GTX 580 GPU, it would is understood the results would have been the same if the results were from a GTX 480 GPU. Thus, it is conjectured that the relative performance ranking is stable across GPUs based on the same architecture.

According to the victory statistic shown in Table 3 of FIG. 8, one may categorize the various kernels into three classes, based on the number of victories of each kernel:

Frequently useful: These are the kernels that have a high probability of being useful across a wide range of dimensions d and/or number of clusters k. They include {AGT, AST, ASUT} for the assignment kernels; and {UGT, US} for the update kernels.

Moderately useful: These are the kernels that have a reduced but still non-negligible probability of being useful. The UST kernel belongs to this class.

Rarely useful: These are the kernels that are useful only for a few specific combinations of d and k. They include {AS, ASU} kernels.

Table 3 motivates an approach to high-performance GPU performance, and in particular to k-means that adapts the kernels based on the values of d and k. It is called herein a smart-kernel approach because the approach picks the best kernels to launch on the GPU by using an intelligent kernel selection algorithm. Now described are several forms the intelligent kernel selection algorithm might take.

Rule-Based Smart Kernels:

This intelligent kernel selection algorithm approach encodes a fixed-kernel selection policy into a set of rules such that, given d and k, the best kernels can be determined efficiently. As examples, a few kernel selection rules are described below:

Minimum-resident-blocks-per-SM rule: This rule prescribes that there is a minimum number of thread blocks (which is a logical group of threads executed on a single SM) of a k-means kernel that must run simultaneously on a single SM. The number of concurrent thread blocks on a SM is usually limited by factors such as the number of registers used by a single thread and the number of threads per block. However, for the present k-means, the main bottleneck is the amount of shared memory used by the following kernels: AS, AST, ASU, ASUT, US, and UST, which are all shared-memory limited kernels, because their shared-memory consumption is what prevents the GPU from running more simultaneous thread blocks on the same SM. Thus, implementing this rule can set a lower bound on the multiprocessor occupancy of the GPU, which is defined as the ratio of active warps to the maximum number of warps supported on a SM. For bandwidth-bound algorithms such as k-means, increasing occupancy can help hide the latency of memory accesses. For shared-memory limited assignment kernels, the minimum-resident-blocks-per-SM is 2; whereas for shared-memory limited update kernels, this number is 3, since the computation is lighter in the update phase, which requires more simultaneous blocks to keep the SMs busy. It's worth noting that such simple rules can effectively produce the optimal selection policy (for Fermi GPUs) of when to choose the global-memory kernels ({AGT, UGT}) instead of the 6 shared-memory limited kernels. For example, this rule would pick the AGT kernel if d≥16 and k=400, because when d≥16 and k=400, the shared memory consumption of a single thread block for kernel $f \in \{AS, AST, ASU, ASUT\}$ is $dk \geq 16 \times 400 = 6400$ floats=25 KB>48 KB/2, which means kernel $f$ cannot run two thread blocks at the same time on a SM with only 48 KB of shared memory. On the other hand, if $d \leq 15$ and $k=400$, $dk \leq 6000$ floats$\leq 48$ KB/2. Thus, for $k=400$, 15 is the maximum value of d that allows two thread blocks of a shared-memory limited assignment kernel to run simultaneously on a SM. For the update kernels, setting the minimum-resident-blocks-per-SM to 3 would favor the UGT kernel when $d \geq 10$ and $k=400$, since the shared memory consumption of the $\{US, UST\}$ kernels is $dk+k \geq 10 \times 400+400=4400$ floats=17.2 KB per thread block, which is greater than one third ($\frac{1}{3}$) of the 48 KB shared memory on a SM. Thus, for $k=400$, 9 is the maximum value of d that allows three thread blocks of either the US or the UST kernel to run simultaneously on a SM. It can be verified that this is the optimal selection strategy for picking the UGT kernel. On the other hand, if the minimum-resident-blocks-per-SM constraint is satisfied, a shared-memory limited kernel would be preferred over a global-memory kernel. In the present k-means, there are multiple shared-memory limited kernels to choose from: $\{AS, AST, ASU, ASUT\}$ for assignment, and $\{US, UST\}$ for update. The following kernel selection rules are used to pick the best kernels among these candidates.

Declarative kernel selection rules: The minimum-resident-blocks-per-SM rule is a kind of implicit rule that picks the best kernels based on their properties such as shared-memory consumption and is defined over all values of d and k by checking if certain mathematical conditions (e.g., $dk \leq 48$ KB/2=24 KB=6144 floats) are met or not. The advantage of implicit rules is that they can be implemented procedurally without taking much space and they handle all possible combinations of d and k, which can be quite large. The downside is that sometimes there may not be any mathematical formula for picking the best kernels that generalizes to arbitrary values of d and k. Meanwhile, implementing implicit rules using control flow statements such as if-then-else can quickly become unwieldy. For example, if one were to hardcode the optimal assignment kernel selection policy for $d \in \{2, 3, 4\}$ and $k \in \{100, 400\}$ based on the first three rows of Table 1, then the procedure may look like:

```
if (k = 100) then
    if (d = 2) then
        return ASU
    else
        return ASUT
    end if
else if (d = 4) then
    return ASUT
else
    return ASU
end if
```

There are multiple issues with the above procedural implementation of the kernel selection rules, including readability, verifiability, modifiability, and extensibility. To avoid these issues, a declarative rule-based system is used to store, query, and fire the kernel selection rules. A declarative kernel selection rule in the present system takes the form of "arguments→kernel" in which "arguments" is a set of arguments for a problem instance that can affect the selection of the kernels, and "kernel" identifies the best kernel or kernel combination (e.g., best assignment kernel+best update kernel) for the problem instance described by arguments.

For k-means, one only needs d and k as arguments, since the number of rows has little or no effect on choosing the best kernels. For the "kernel" part (i.e., the right-hand side) of a rule, there are a number of ways to specify the best kernel or kernel combination, by storing one of the following information:

A numeric id (or ids) of the best kernel (or kernel combination)

A symbolic name (or names) of the best kernel (or kernel combination)

A list of kernel features that can uniquely identify the best kernel (or kernel combination)

The first option requires each kernel having a unique numeric id, which may be harder to keep track and thus more difficult to maintain over time. The last two options are easier to understand and less error-prone. For example, the optimal assignment policy for $d \in \{2, 3, 4\}$ and $k \in \{100, 400\}$ can be stated in the form of "d, k→kernel" as follows:

2, 100→ASU
2, 400→ASU
3, 100→ASUT
3, 400→ASU
4, 100→ASUT
4, 400→ASUT

If the best update kernel is added to the right-hand side of the rules according to the first three rows of Table 2, then the rules become as follows (e.g., showing examples of some "best" kernel combinations):

2, 100→ASU, US
2, 400→ASU, US
3, 100→ASUT, US
3, 400→ASU, US
4, 100→ASUT, US
4, 400→ASUT, US

The above declarative kernel selection rules work well for problems with a small number of discrete arguments, such as k-means with a limited range of d and k, for which a system can simply store one rule for each of the d-k combinations, if $d \in [2, 40]$ and $k \in [1, 400]$. However, for problems with a wider argument range or continuous arguments, the declarative rules must be extended to handle the case in which no rule matches with the arguments of a given problem instance. For example, in the previous discussion, if $k=500$, the system has no clear kernels that it should select.

To address this situation introduced is the concept of an argument distance function between two sets of arguments (e.g., $A_1$ and $A_2$), denoted as $\delta(A_1, A_2)$. If a problem instance with an argument set A is not found in the rule database (which in certain embodiments is implemented in one of the memory areas of the system of FIG. 1) the, then the system will pick an existing rule whose left-hand side matches most closely with A, according to an argument distance function.

In this regard, let R be the set of kernel selection rules. Let $r \cdot A$ be the set of arguments of rule $r \in R$. Let $\delta$ be a nonnegative argument distance function such that $\delta(A, A) \equiv 0$. The rule to be selected for a problem instance with an argument set A is:

$$r^* = \operatorname{argmin}_{r \in R} \delta(A, r \cdot A)$$

As long as the rule database is not empty and no two rules can have the same left-hand side (i.e., the same argument set), the above rule selection formula always returns a unique best rule $r^*$, whose right-hand side contains the best kernel (or kernel combinations). The same formula works not only for problem instances with the same argument set as one of the existing rules, but also for those without. In the former case, $r^*$ must be the rule with a matching argument set, because δ (A, r·A)≡0 and δ is non-negative. In the latter case, r* is the rule with the minimum argument distance from that of the problem instance. While a good argument distance function may depend on the domain, common examples include weighted sum of absolute or squared argument error functions. For the present k-means example, let $A_1=(d_1, k_1)$ and $A_2=(d_2, k_2)$, δ can be one of the following:

$$w_d|d_1-d_2|+w_k|k_1-k_2|$$

$$w_d(d_1-d_2)^2+w_k(k_1-k_2)^2$$

where $w_d \geq 0$ and $w_k \geq 0$. Both satisfy the condition that δ is non-negative and δ (A, A)≡0. Of course, picking the best weights $w_d$ and $w_k$ may depend on the particular application of k-means, which can affect the likely values of d and k. Also, the weights may subject to change, should the underlying GPU hardware changes.

A particular aspect of rule-based smart kernels is that they allow off-line optimization for the range of arguments that are most common to a given application. Because the rules are pre-computed, the overhead of picking the best kernels is usually negligible. With the help of an argument distance function, the rule-based approach can generalize to novel arguments that do not match with any of the existing rules.

On-Line Smart Kernels:

A different intelligent kernel selection algorithm concept for the present smart-kernel approach is to use on-line learning to pick the best kernels. The on-line approach assumes that the problem instance can be scaled back in computational complexity such that all the α-kernels can be tested on a time-reduced version of the original problem to find the best α-kernels, which are used subsequently to solve the original problem. As mentioned earlier, the number of rows has little or no impact on the relative performance ranking of various k-means kernels and thus only a small fraction of the rows need to be included in the reduced problem for testing purposes.

In this regards, let $u \geq 1$ be the number of α-kernels, and let $v_j$ be the speed of j-th α-kernel, where $j \in [1,u]$. Let $t_{rand}$ be the expected runtime of a kernel chosen at random. Under these terms one has the following proportionality result:

$$t_{rand} \propto \frac{\frac{1}{v_1}+\frac{1}{v_2}+\ldots+\frac{1}{v_u}}{u}$$

Let $s \in (0,1]$ be the scaling factor with which to create a time-reduced test version of the original problem, such that the time it takes to solve the test problem is equal to the original problem solving time multiplied by s. Let $t_{test}$ be the time for testing all u kernels on the test problem. One has:

$$t_{test} \propto \frac{s}{v_1}+\frac{s}{v_2}+\ldots+\frac{s}{v_u}$$

Let $v_{max}$ be the speed of the fastest kernel, and let $t_{fast}$ be the time for running the fastest kernel on the original problem. One has:

$$t_{fast} \propto \frac{1}{v_{max}}$$

Let $t_{smart}=t_{test}+t_{fast}$ be the total time for picking the fastest kernel on the test problem and running the fastest kernel on the original problem. It can be shown that $t_{smart} < t_{rand}$, if the following inequality holds:

$$\frac{s}{v_1}+\frac{s}{v_2}+\ldots+\frac{s}{v_u}+\frac{1}{v_{max}} < \frac{\frac{1}{v_1}+\frac{1}{v_2}+\ldots+\frac{1}{v_u}}{u}$$

Let $\bar{v}$ be the harmonic mean of $v_j$ for $j \in [1,u]$, that is, $$\bar{v} = \frac{u}{\frac{1}{v_1}+\frac{1}{v_2}+\ldots+\frac{1}{v_u}}$$

plug this into the inequality, one gets:

$$\frac{su}{\bar{v}} + \frac{1}{v_{max}} < \frac{1}{\bar{v}}$$

$$su v_{max} + \bar{v} < v_{max}$$

$$su + \frac{\bar{v}}{v_{max}} < 1$$

Let $h = \frac{\bar{v}}{v_{max}} \in (0, 1]$ be the ratio of the harmonic-mean kernel speed over the maximum kernel speed. Such a ratio is called the h-max ratio. The above inequality can be written as:

$$s < \frac{1-h}{u}$$

Let $s_{max} = \frac{1-h}{u}$ be the maximum value of the scaling factor s. According to the above inequality, the total time taken by the smart kernel is shorter than the expected runtime of a randomly chosen kernel, if $s < s_{max}$. Let $t_j$ be the runtime of kernel j, and let $t_{min}$ be the runtime of the fastest kernel. Since $$t_j \propto \frac{1}{v_j} \text{ and } t_{min} \propto \frac{1}{v_{max}},$$

one has $$h = \frac{\bar{v}}{v_{max}} = \frac{\frac{1}{v_1}+\frac{1}{v_2}+\ldots\frac{1}{v_u}}{v_{max}} = \frac{u}{\frac{t_1+t_2+\ldots+t_u}{\frac{1}{t_{min}}}} = \frac{ut_{min}}{\sum_{j=1}^{u} t_j}$$

Thus, given the time taken by each kernel and the number of α-kernels, one can compute h and the maximum scaling factor $s_{max}$. FIG. 9 of Table 4 shows the results of h and $s_{max}$ for various d and k of the assignment and update kernels.

Table 4 shows the distribution of $s_{max}$ as a function of d, k and the task performed by the kernels. For example, the first row tells us that for d=2 and k=100, as long as the test problem takes less than 5.1% (or 14%) of the time it takes to solve the original problem, then on-line smart kernels are expected to run faster than kernels chosen at random for the assignment (or update) task. Unless u=1 (i.e., there is only a single α-kernel) or all α-kernels have the exact same speed for a particular dataset, there should always be a scaling factor s<$s_{max}$ that favors the on-line smart kernels. In practice, the test problem needs to be of a minimum size, in order to produce reliable timing results for picking the fastest kernel, and thus if $s_{max}$ is close to 0, running a test first may not be worth it. Of course, for big datasets, this should not be a concern.

Introduced here is the concept of the minimum test problem size, which is defined as the size of the smallest test problem that can still produce reliable timing measurements. For k-means, one can use the number of rows to describe the minimum test problem size. Of course, such a number may vary as d or k changes. To create a test problem, one can also reduce the number of iterations to 1, which is usually sufficient for testing purpose. In general, the method with which to create a test problem can be domain-dependent.

Recall the scaling factor s is with respect to the problem solving time, rather than the problem size. However, for k-means or any algorithm whose time complexity is linear in the size of the problem, s can also be seen as a size-based scaling factor. One can use $s_{max}$ to decide whether it makes sense to use the on-line smart kernels, as follows. First, one computes the size of the test problem created by $s_{max}$ (e.g., by multiplying the original problem size with $s_{max}$) and compares the resulting problem size with the minimum test problem size. If the resulting problem size is bigger than the minimum test problem size, then on-line smart kernels should be used; otherwise picking kernels at random is better. In the former case, the algorithm should create a test problem that is as big as (but not smaller than) the minimum test problem size; in the latter case, no test problem is created.

For the present k-means example, if $s_{max}$=5.1%, the input data has 1 million rows, and only 1 iteration is needed, then as long as the minimum test problem size is no larger than 1,000,000×5.1%=51,000 rows, one should favor the on-line smart kernels over the randomly chosen ones. On the other hand, if the minimum test problem size is 1,000 rows, then as long as the dataset contains no fewer than 1,000/5.1%=19,608 rows, the on-line smart kernels should still be preferred. If the number of iterations is more than 1, then the input data can be even smaller. For example, if 10 iterations are needed, then even a dataset with only 1,000/5.1%/10=1,961 rows can benefit from on-line smart kernels in the previous case.

The last column in Table 4 of FIG. 9 shows ŝ, the minimum $s_{max}$ for a given d. It can be used as a conservative estimate of the true $s_{max}$, which cannot be computed unless all the kernel speeds are known. Thus, in practice one may not want to compute $s_{max}$ but simply uses ŝ to decide if on-line smart kernels are to be preferred to the random ones.

Hybrid Smart Kernels:

A still further intelligent kernel selection algorithm approach, takes into consideration that an aspect of on-line smart kernels is that they are self-adaptive without any prior knowledge of the system, unlike the rule-based smart kernels. However, a disadvantage is that on-line kernels require test trials, which incur some computational overhead; whereas the rule-based kernels have very fast kernel selection speed. Furthermore, estimating $s_{max}$ can be another overhead for the on-line smart kernels.

Hybrid smart kernels take ideas from both rule-based and on-line smart kernels as follows: it maintains an on-line rule database (which may or may not be initially empty) such that a new rule is created for each new class of problem instances solved, but if the instance belongs to a previously solved class, then the system applies the rule found in the database without paying any learning overhead. This hybrid approach combines the merits of the two previous smart-kernel approaches without their drawbacks. It is noted that in certain embodiments the on-line rule database is implemented in one of the memory areas of the system of FIG. 1.

Implementations:

Included in the foregoing are teachings related to methods and systems to test and select useful smart kernels for general-purpose GPU computing.

Figure 10A:
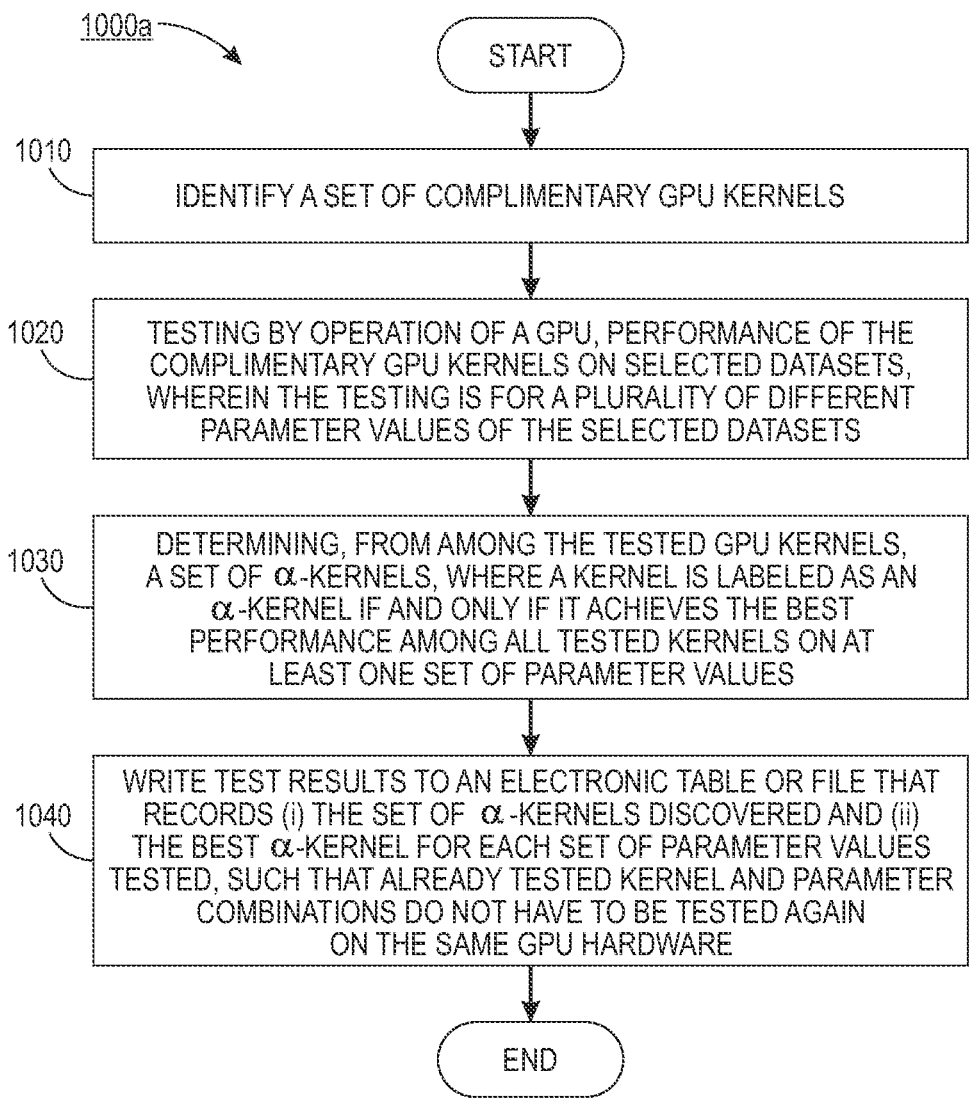
FIG. 10A is a flow diagram for testing, identifying and writing graphics processing unit (GPU) kernels for operation on a graphics processing unit (GPU)

Turning to FIG. 10A, one implementation of such teaching is illustrated by flow diagram 1000a, directed to a method for testing and selecting graphics processing unit (GPU) kernels for operation on a graphics processing unit (GPU) for investigation of datasets. More particularly following a start (START), the process moves to identify a set of complimentary GPU kernels (this may be performed by a programmer reviewing different kernel sets, or automatically via an automated selection operation) (step 1010). The identified set of complementary GPU kernels are then tested, by operation of the GPU, to determine the performance of the complementary GPU kernels on selected test datasets, wherein the testing is for a plurality of different parameter values of the selected test datasets (step 1020). Following the testing step, it is determined from among the tested GPU kernels, a set of α-kernels, where a kernel is labeled as an α-kernel if and only if it achieves the best performance among all tested kernels on at least one set of parameter values tested (step 1030). Then, the test results are written (e.g., stored) to an electronic table or file (e.g., a memory element) that records (i) the set of α-kernels discovered and (ii) the best α-kernel for each set of parameter values tested, such that already tested kernel and parameter combinations do not have to be tested again on the same GPU hardware (step 1040), where after the process ends (END).

Figure 10B:
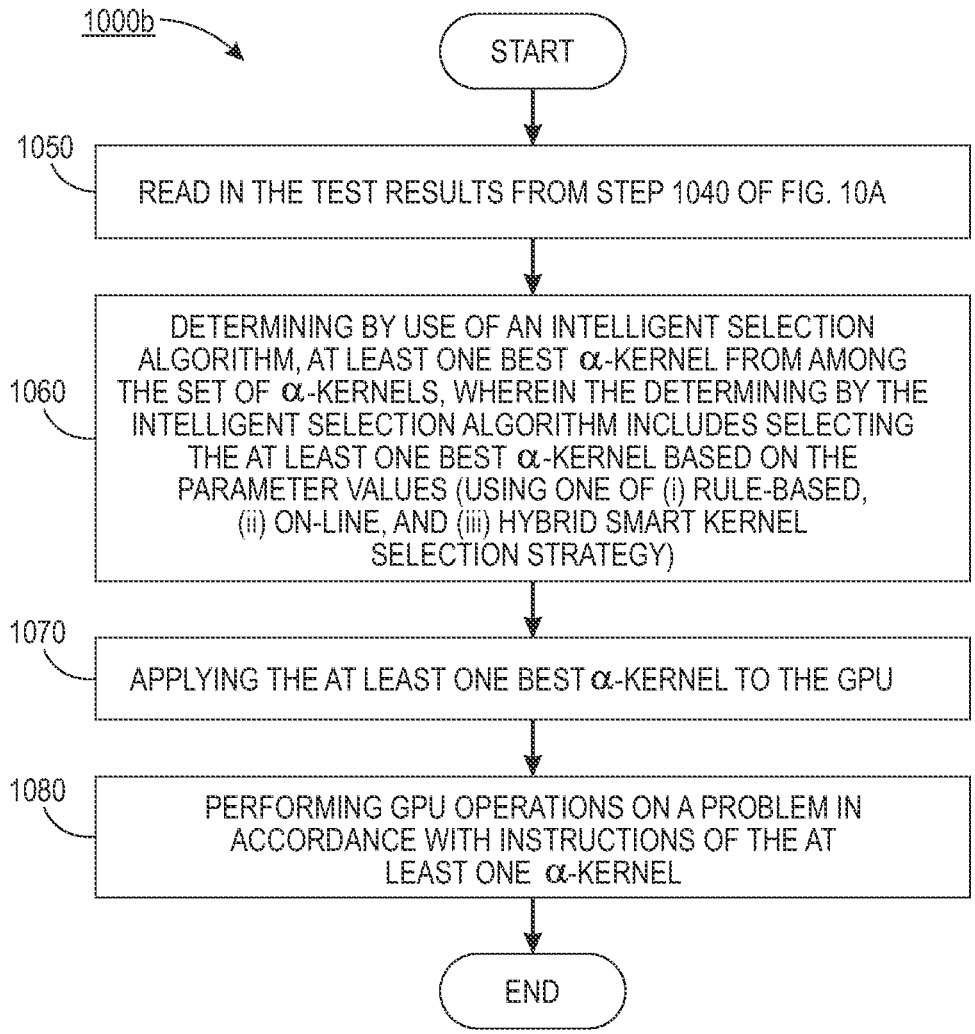
FIG. 10B is a flow diagram to read in test results obtained in FIG. 10A and to use those results in processing on a GPU.

Next, turning to FIG. 10B flow diagram 1000b illustrates the application of the test results to a GPU. More particularly, after starting (START), the process reads in the test results from (for example) step 1040 of FIG. 10A (step 1050). Then, from among the set of tested α-kernels, a determination is made, by use of an intelligent selection algorithm, as to at least one best α-kernel from among the set of α-kernels, wherein the determining by the intelligent selection algorithm includes selecting the at least one best α-kernel based on the parameters values (step 1060). Next, the at least one best α-kernel is applied to the GPU (step 1070). Finally, the GPU performs operations on a problem in accordance with instructions of the at least one best α-kernel (step 1080), where after the process is completed (END).

The flow diagrams of FIGS. 10A and 10B therefore are directed to obtaining kernels that would be the best kernels (e.g., best α-kernels) for particular problem instances.

Thus, FIGS. 10A and 10B support the teaching that from among a plurality of distinct kernels, there will be situations where, at least one of the α-kernels will be a "best" kernel for a particular situation. This, along with Table 3 of FIG. 8 illustrates that each identified α-kernel of the set will be a "best" kernel for a particular problem instance. Therefore, all kernels of the α-kernel group will at some point be a best kernel.

Figure 11A:
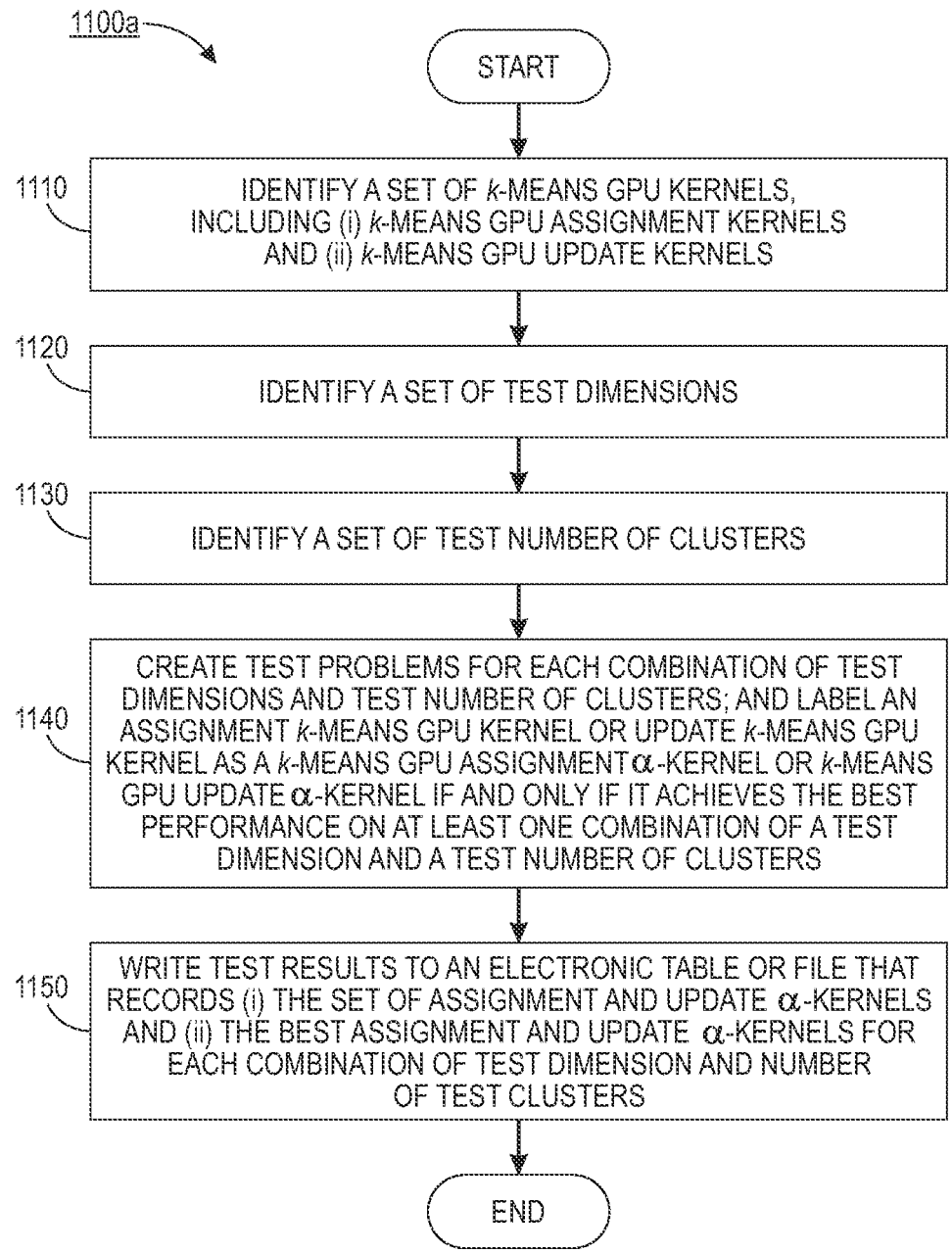
FIG. 11A is a flow diagram for testing, identifying and writing graphics processing unit (GPU) kernels for use in a k-means clustering algorithm using a graphics processing unit (GPU) to perform operations on an electronically stored dataset.
Figure 11B:
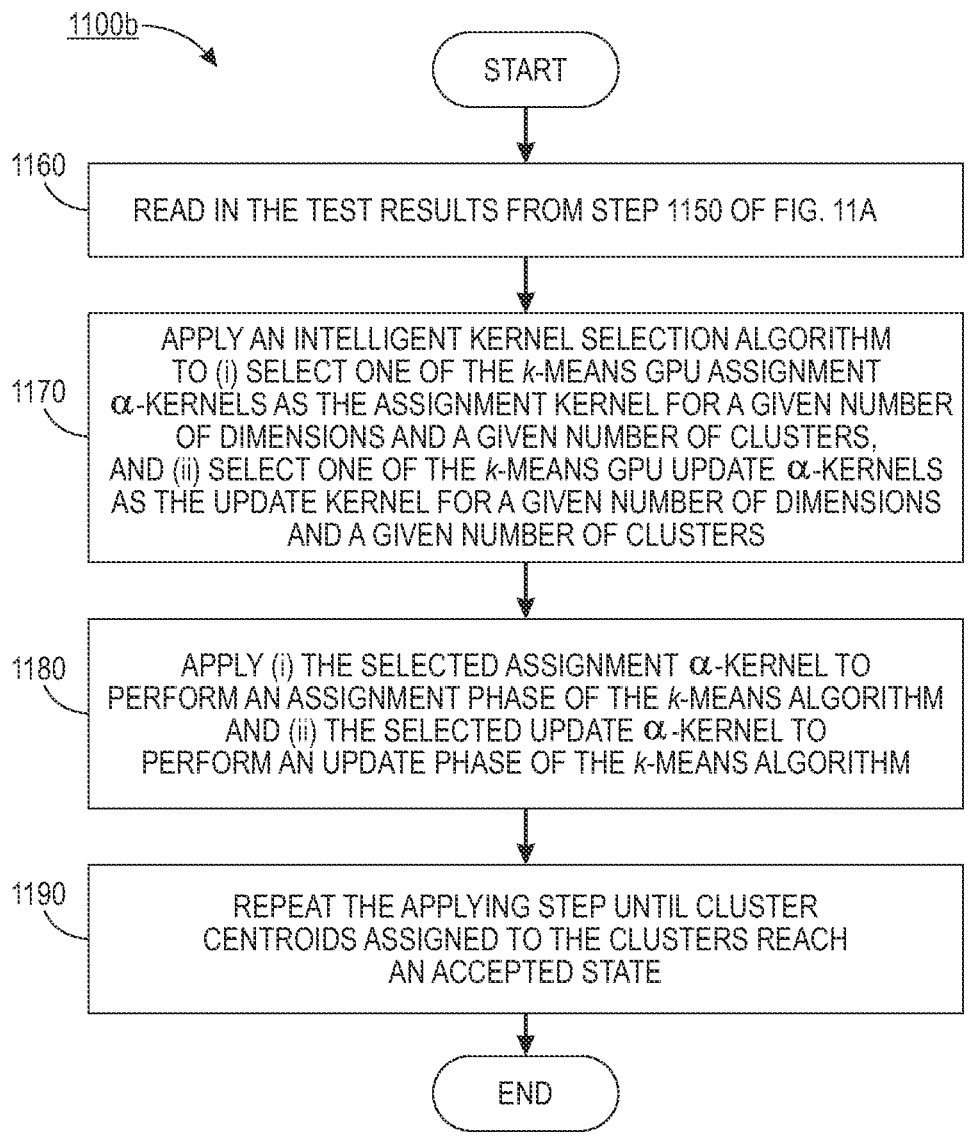
FIG. 11B is a flow diagram to read test results obtained in FIG. 11A and to use those test results in the k-means clustering algorithm operations.

Turning now to FIGS. 11A and 11B, flow diagrams 1100a and 1100b illustrate a particular implementation of the present teachings as they relate to a method of performing a k-means clustering algorithm using a GPU to perform operations on electronically stored datasets. More particularly, following a start (START) of the process of flow diagram 1100a of FIG. 11A, a set of k-means GPU kernels are identified, wherein the k-means GPU kernels include (i) k-means GPU assignment kernels and (ii) k-means GPU update kernels (step 1110).

Then, a set of test dimensions are identified (step 1120).

Next, a set of test numbers of clusters are identified (step 1130).

Thereafter, a test problem is created for each combination of the test dimensions and the test numbers of clusters for selected test datasets. An assignment or update k-means GPU kernel is labeled as a k-means GPU assignment α-kernel or update α-kernel if and only if it achieves the best performance among all the k-means GPU assignment or update kernels for at least one combination of the test dimensions and the test numbers of clusters during the testing operations of the selected test datasets (Step 1140). Next, the test results are written (e.g., stored) to an electronic table or file (e.g., a memory element) that records (i) the set of assignment and update α-kernels discovered and (ii) the best assignment and update α-kernels for each combination of a test dimensions and number of test clusters (step 1150), where after the process ends (END).

Next, turning to FIG. 11B flow diagram 1100b illustrates the application of the test results to a GPU. More particularly, after starting (START), the process reads in the test results from (for example) step 1540 of FIG. 11A (step 1160).

Once the test results have been read in, an intelligent kernel selection algorithm is applied to the set of the identified α-kernels to (i) select one of the k-means GPU assignment α-kernels as the assignment kernel for a given number of dimensions and a given number of clusters, and (ii) select one of the k-means GPU update α-kernels as the update kernel for a given number of dimensions and a given number of clusters (Step 1170).

Then, (i) the selected assignment α-kernel is applied to perform an assignment phase of the k-means algorithm, and (ii) the selected update α-kernel is applied to perform an update phase of the k-means algorithm, for a problem (actual problem dataset not test problem dataset) having the same number of dimensions and the same number of clusters (Step 1180).

The applying of the assignment α-kernel and the update α-kernel is repeated until cluster centroids assigned to the clusters reach an accepted state (Step 1190).

It is noted that in flow diagram 1100a and 1100b the selected assignment α-kernel and the selected update α-kernel are understood to be the "best" kernel for a particular problem instance of the problem to be solved.

Aspects of the Present Disclosure

In view of the above, it is understood what has been described herein has been identified by the inventor as a "smart kernel" concept. It is noted that in GPU operations prior to the present teachings only a single or at the most (a very small number) of kernels, that were assumed efficient in their use of the GPU resources (in prior studies and literature, it appears that only a single kernel or two kernels, are used in or adapted to be applied to the GPU for problem solving and/or dataset investigation. As has been described, the present disclosure takes a different approach, and uses an adaptive (intelligent) selection strategy, where instead of finding one or two kernels, the present disclosure provides an implementation which may use dozens or hundreds of different kernel instantiations which are based on a certain pattern or template kernels (e.g., the AG, AGT, AS, AST, ASU, ASUT, UG, UGT, US, and UST examples). It is then possible to create hundreds or thousands of different incarnations or different instantiations from such templates.

As has been described above, in any GPU implementation, the "best" kernel for a particular task will under these teachings depend on the parameters for the specific presented. Thus, this disclosure provides a fine-grained selection strategy, where each unique parameter and/or combination of parameters are treated as "first class citizens", with the present system and method designed to use customized "best" kernels that will perform in an optimized manner for the particular parameter or combination of parameters.

It is considered the present smart-kernel approach handles a wider range of data dimensions and number of clusters than previously studied. For comparison with a CPU, a single-threaded CPU k-means in C was implemented with state-of-the-art sequential performance. The present test machine included two six-core 3.46 GHz Xeon 5690 processors, each with 12 MB of L2 cache. The test GPU is Nvidia's GeForce GTX 580.

Turning to FIG. 12 Table 5 shows a comparison between the speed of various k-means implementations, including CPU ("CPU" titled column), fixed-kernel GPU ("Fixed" titled column), and smart-kernel GPU based ("Smart" titled column). On average, the present smart-kernel k-means is 186× faster than a highly optimized sequential C implementation for both k=100 and k=400. For fixed-kernel GPU k-means, a combination of AGT and UGT kernels were used, both are general enough to handle all values of d and k. They are also the fastest general-purpose kernels in the experiments. It was noticed that they are believed to be considerably faster than previous k-means kernels proposed in the literature that store centroids in either constant or texture memory on GTX 580.

Furthermore, the experiments show that binding the input data to texture memory can improve performance; whereas previously mentioned work such as, Ren Wu, Bin Zhang, and Meichum Hsu, GPU-Accelerated Large Scale Analytics, HP Laboratories, Hewlett-Packard Development Company, L.P. (Mar. 6, 2009) only considered using texture memory to access the centroids but not the input data.

Both of the fixed-kernel implementation and smart-kernel GPU k-means work directly on row-based data, thus eliminating the need for data transposition, which can be particularly problematic for large datasets.

Table 5 further shows the smart-kernel approach is especially effective for data with fewer dimensions and number of clusters than the fixed-kernel approach. This is useful for an algorithm like k-means, which is known to work better with low-dimensional datasets. For high-dimensional data, k-means must cope with the so-called "curse of dimensionality" problem, and thus the clustering results could become less accurate as d increases. Nevertheless, the present GPU k-means is consistently faster than the CPU version, across the full range of dimensions tested. Between the two GPU versions, the smart-kernel approach is 50% faster for k=100 and 15% faster for k=400, on average, than the fixed-kernel approach. However, if one considers only those dimensions for which u>1 (i.e., more than one α-kernel exists), then the average speed up of the smart kernel over fixed kernel is 21% for k=400.

Not only significantly faster, GPUs are also much cheaper than CPUs: the cost of GTX 580 GPU is currently less than $400, but a single Xeon 5690 processor costs around $1800. Assuming a linear speed up of the sequential CPU k-means if all 6 cores of X5690 were used, the present smart-kernel GPU k-means will be 186/6=31× faster than a perfectly parallelized CPU k-means on an X5690 processor. From a performance-per-dollar perspective, the smart-kernel GPU k-means is about 140× more cost-effective than an ideally parallelized CPU k-means on the present test machine.

A GPU-based solution is also extensible, since adding or upgrading GPUs of an existing system is far easier than adding or upgrading the CPUs in the same box. For commodity hardware, the maximum number of CPUs is typically 2 or 4; whereas a single commodity GPU server can hold up to 8 GPUs, each of which can have up to a few thousand cores (e.g., Nvidia's Tesla K40 GPU has 2,880 cores). Thus, GPUs excel CPUs not only in performance per dollar or FLOPS per watt, but also in performance per rack unit.

Variations and/or Alternatives

Although one could use a random or existing fixed-kernel approach, it may not perform as well as the presently described smart-kernel approach. Furthermore, finding the overall best fixed kernel that works for a wide range of input data can be challenging, as it often requires systematic testing over multiple kernel candidates and multiple input data under a variety of parameters. Thus, in situations where it is desired to pick a fixed kernel (e.g., preferably an overall best fixed kernel) the techniques described herein in the selection of smart kernels may be equally applicable to determining a "best" fixed α-kernel, when compared to a random approach or existing fixed-kernel approach.

One variation for the present disclosure is to employ streams in smart kernels. A stream is a sequence of operations executed on the GPU in the order they are issued by the CPU. The main purpose of streams is to overlap data transfer with computation performed by either the CPU or the GPU, and in some cases even with another data transfer between the CPU and the GPU. With the help of streams, a large dataset that doesn't fit entirely on the GPU can be divided into pieces such that while the GPU is processing one piece, it can receive the next piece or send back the result of the previous piece at the same time. Streams are a standard technique in GPU computing, and they are fully allowed by the present smart kernels. For example, the on-line smart kernels can use one stream to perform kernel testing, while another stream is dedicated to data transfer.

CONCLUSION

The foregoing has described a general GPU kernel selection framework that works for a wide variety of datasets. Although k-means clustering is used as a motivating example, most of the techniques are neither limited to k-means nor to clustering, since they can be applied to other data mining or machine learning algorithms using the same smart-kernel design framework. Moving forward, as new GPU architectures such as Kepler and Maxwell are made available, the present teachings may be used for an intelligent GPU kernel mixer/selector for these updated GPUs. Particularly, the described on-line smart kernels can adapt to future hardware on the fly; whereas other techniques such as rule-based smart kernels make it practical to perform off-line kernel-selection optimization and policy transfer between GPUs. Thus, while the primary focus has been on GPUs with certain architecture, it is to be understood the teachings set forth herein may be applied to any of a number of different GPUs, developed by any of a number of different companies and different GPU architectures.

It is understood the various methods, algorithms and processes described herein may be embodied as software. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth.

Additionally, the methods, algorithms, and processes described herein may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of performing a k-means clustering algorithm using a graphics processing unit (GPU) to perform operations on an electronically stored dataset, the method comprising:
   identifying a set of k-means GPU kernels, the k-means GPU kernels including (i) k-means GPU assignment kernels and (ii) k-means GPU update kernels;
   identifying a set of test dimensions;
   identifying a set of test numbers of clusters;
   creating a test problem for each combination of the test dimensions and the test numbers of clusters, wherein an assignment k-means GPU kernel or update k-means GPU kernel is labeled as a k-means GPU assignment α-kernel or an k-means GPU update α-kernel if and only if it achieves the best performance among all the k-means GPU assignment kernels or k-means GPU update kernels for at least one combination of the test dimensions and the test numbers of clusters;
   writing test results to an electronic table or a file that records (i) the set of k-means GPU assignment and update α-kernels discovered and (ii) the best k-means GPU assignment and update α-kernels for each combination of the test dimensions and the test numbers of clusters, such that already-tested kernel and parameter combinations do not have to be tested again on the same GPU hardware;
   applying, once a set of k-means GPU assignment α-kernels and a set of update α-kernels are determined, an intelligent kernel selection algorithm to the set of the α-kernels to (i) select one of the k-means GPU assignment α-kernels as the assignment kernel for a given number of dimensions and a given number of clusters, and (ii) select one of the k-means GPU update α-kernels as the update kernel for a given number of dimensions and a given number of clusters; applying (i) the selected assignment α-kernel to perform an assignment phase of the k-means algorithm, and (ii) the selected update α-kernel to perform an update phase of the k-means algorithm; and repeating the applying of the selected assignment α-kernel and the selected update α-kernel until cluster centroids assigned to the clusters reach an accepted state;

wherein at least one of the k-means GPU kernels is configured to bind input data stored in a global memory of the GPU to a texture memory of the GPU, when a number of floats encoding the input data is less than a hardware limit for a ID texture memory of the GPU.

2. The method of claim 1 wherein at least one of the k-means assignment GPU kernels accesses the cluster centroids stored in a global memory of the GPU without first loading the cluster centroids into a shared memory of the GPU, and the at least one k-means assignment GPU kernel is further configured to prefer a L1 cache of the GPU over the shared memory of the GPU.

3. The method of claim 1 wherein at least one of the k-means assignment GPU kernels loads the cluster centroids or at least some of the centroids into a shared memory of the GPU, and the at least one k-means assignment GPU kernel is configured to prefer the shared memory of the GPU over L1 cache of the GPU.

4. The method of claim 3 wherein implementing the at least one k-means assignment GPU kernel, further includes performing a loop unrolling technique that eliminates if-statements in order to unroll a centroid-enumeration loop.

5. The method of claim 1 wherein at least one k-means update GPU kernel updates the cluster centroids stored in a global memory of the GPU without first loading the cluster centroids into a shared memory of the GPU, and the at least one k-means update GPU kernel is configured to prefer a L1 cache of the GPU over the shared memory of the GPU.

6. The method of claim 1 wherein at least one k-means update GPU kernel updates cluster centroids stored in a shared memory of the GPU, and writes out updated cluster centroids to a global memory of the GPU, and wherein the at least one k-means update GPU kernel is configured to prefer the shared memory of the GPU over a L1 cache of the GPU.

7. The method of claim 1 wherein at least one k-means assignment GPU kernel includes input data which is bound to texture memory.

8. The method of claim 3 wherein the at least one k-means assignment GPU kernel, includes having input data which is bound to texture memory.

9. The method of claim 4 wherein the at least one k-means assignment GPU kernel includes having input data which is bound to texture memory.

10. The method of claim 5 wherein the at least one k-means update GPU kernel has input data bound to texture memory.

11. The method of claim 6 wherein the at least one k-means update GPU kernel has input data bound to texture memory.

12. A graphics processing unit (GPU) based k-means clustering system comprising:
an electronic based memory configured to store a set of k-means GPU kernels, wherein the set of k-means GPU kernels include (i) k-means GPU assignment kernels and (ii) k-means GPU update kernels;
an electronic dataset storage area for storing datasets;
a set of test dimensions;
a set of test numbers of clusters;
a graphics processing unit (GPU) configured to include a test processing area for creating a test problem for each combination of the set of test dimensions and the set of test numbers of clusters, wherein an assignment k-means GPU kernel or update k-means GPU kernel is labeled as a k-means GPU assignment α-kernel or k-means GPU update α-kernel if and only if it achieves the best performance among all the k-means GPU assignment kernels or k-means GPU update kernels for at least one combination of the test dimensions and the test numbers of clusters, and the GPU further configured to apply an intelligent kernel selection algorithm to the set of the identified α-kernels to: (i) select one of the k-means GPU assignment α-kernels as the assignment kernel for a given number of dimensions and a given number of clusters, and (ii) select one of the k-means GPU update α-kernels as the update kernel for a given number of dimensions and a given number of clusters, wherein (i) the selected assignment α-kernel is applied to perform an assignment phase of the k-means algorithm, and (ii) the selected update α-kernel is applied to perform an update phase of the k-means algorithm, and wherein the applying of the assignment α-kernel and the update α-kernel is repeated until cluster centroids assigned to the clusters reach an accepted state; and
a central processing unit (CPU) configured to communicate with the GPU, wherein the CPU stores an electronic table or file that records (i) the set of k-means GPU assignment and update α-kernels discovered and (ii) the best k-means GPU assignment and update α-kernels for each combination of the test dimensions and the test numbers of clusters, such that already-tested kernel and parameter combinations do not have to be tested again on the same GPU hardware;
wherein at least one of the k-means GPU kernels is configured to bind input data stored in a global memory of the GPU to a texture memory of the GPU, when a number of floats encoding the input data is less than a hardware limit for a ID texture memory of the GPU.

13. The system of claim 12 wherein the GPU includes a plurality of GPUs.

14. The method of claim 1 wherein the test problem is a reduced version of an original problem.

* * * * *